United States Patent
Zhang et al.

(10) Patent No.: US 11,536,586 B2
(45) Date of Patent: Dec. 27, 2022

(54) SYSTEM, METHOD, AND COMPUTER PROGRAM PRODUCT FOR IDENTIFYING A ROAD OBJECT

(71) Applicant: HERE Global B.V., Eindhoven (NL)

(72) Inventors: Zhenhua Zhang, Chicago, IL (US); Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 29 days.

(21) Appl. No.: 17/096,600

(22) Filed: Nov. 12, 2020

(65) Prior Publication Data

US 2022/0082406 A1    Mar. 17, 2022

Related U.S. Application Data

(60) Provisional application No. 63/079,823, filed on Sep. 17, 2020.

(51) Int. Cl.
*G01C 21/00* (2006.01)
*G01S 19/00* (2010.01)

(52) U.S. Cl.
CPC .......... *G01C 21/3804* (2020.08); *G01S 19/00* (2013.01)

(58) Field of Classification Search
CPC ............................ G01C 21/3804; G01S 19/00
See application file for complete search history.

(56) References Cited

U.S. PATENT DOCUMENTS

| | | | |
|---|---|---|---|
| 2007/0219716 A1* | 9/2007 | Shiragami | G08G 1/096827 701/414 |
| 2016/0117923 A1* | 4/2016 | Dannenbring | G08G 1/09623 340/905 |
| 2017/0154229 A1* | 6/2017 | Yoshitomi | B60Q 9/00 |
| 2018/0023959 A1 | 1/2018 | Ivanov et al. | |
| 2019/0243370 A1* | 8/2019 | Li | B60W 30/08 |
| 2019/0325349 A1 | 10/2019 | Zhang et al. | |
| 2020/0018604 A1 | 1/2020 | Zhang et al. | |
| 2020/0242377 A1* | 7/2020 | He | G06V 20/582 |
| 2021/0231441 A1* | 7/2021 | Fortmann | G08G 1/166 |

* cited by examiner

*Primary Examiner* — Hunter B Lonsberry
*Assistant Examiner* — Harrison Heflin
(74) *Attorney, Agent, or Firm* — Ditthavong, Steiner & Mlotkowski

(57) ABSTRACT

There is disclosed at least a method for receiving a road object observation associated with the road object for a first link. The first link is associated with at least one second link. A first heading data is determined for the received road object observation. A matched location is determined for the received road object observation on the at least one second link. A second heading data is determined for the received road object observation, based on the determined matched location. The road object is identified based on the determined first heading data and the determined second heading data, wherein as a result of identifying, the identified road object is either determined as associated with the first link or is determined to be not associated with the first link.

19 Claims, 13 Drawing Sheets

SYSTEM, METHOD, AND COMPUTER PROGRAM PRODUCT FOR IDENTIFYING A ROAD OBJECT

RELATED APPLICATION

This application claims priority from U.S. Provisional Application Ser. No. 63/079,823, entitled "SYSTEM, METHOD, AND COMPUTER PROGRAM PRODUCT FOR IDENTIFYING A ROAD OBJECT," filed on Sep. 17, 2020, the contents of which are hereby incorporated herein in their entirety by this reference.

TECHNOLOGICAL FIELD

The present disclosure generally relates to routing and navigation systems, and more particularly relates to identifying a road object for routing and navigation applications.

BACKGROUND

Currently, various navigation applications are available for vehicle navigation. These navigation applications generally request navigation related data from a navigation service. The navigation related data may include data about navigation routes and road objects on these routes such as road signs, traffic objects, road obstacles and the like. The navigation related data or map data thereof in the navigation service may be updated by sensor data associated with the road objects to provide up-to-date navigation related data on a requested route. Indeed, the sensor data associated with the road objects should be accurate to accurately provide the navigation related data. However, the sensor data associated with the road objects may not be accurate in identifying the road objects in road geometries such as ramp links, parallel links, merging links and the like.

BRIEF SUMMARY OF SOME EXAMPLE EMBODIMENTS

Some embodiments are based on recognition that the sensor data associated with the road objects or road object observations associated with the road objects may not be accurate in identifying the road objects, because sensors equipped in a vehicle may mis-identify or wrongly identify the road objects on an another link as the road objects on a current link. For instance, the sensors of the vehicle may identify a road object on a ramp link, a parallel link, a merging link and like as a road object on a main link, when the vehicle is travelling through the main link. Hereinafter, the term 'sensor data' and 'road object observation(s)' may be interchangeably used to mean the same.

To that end, various embodiments are provided to process the road object observations associated with the road objects such that the road objects are accurately identified and associated with relative links. Various embodiments are provided for receiving the road object observation associated with the road object for a first link. In various embodiments, the first link may be associated with at least one second link. In various embodiments, the road object observation may comprise a location of the vehicle at where the road object observation was made, road object information of the road object. Additionally, the road object observation may comprise timestamp data indicating a time instance (also includes date, month, and year) at which the road object observation was made. As used herein, the first link may refer to a road segment between two nodes. In various embodiments, the first link may be a freeway, a highway, an expressway, and the like. As used herein, the second link may refer to a road segment between two nodes. In various embodiments, the second link may be a ramp link, a parallel link, a merging link, and the like. In various embodiments, the road object may comprise a road sign, a traffic object, a road obstacle, and the like.

Various embodiments are provided for determining a first heading data for the received road object observation. In various embodiments, the first heading data may comprise a heading data associated with the road object. As used herein, the heading data may be a direction for the road object and may be measured relative to a north direction or a line-of-sight direction.

Various embodiments are provided for determining a matched location for the road object observation on the at least one second link. In various embodiments, the matched location may be a location on the at least one second link such that a distance between the location and a location associated with the road object observation is shortest distance in comparison to any other location on the at least one second link. In some example embodiments, the matched location may be a scalar projection of the road object observation on the at least one second link.

Various embodiments are provided for determining a second heading data for the road object observation, based on the matched location. In various embodiments, a derived heading data may be determined based on the matched location for determining the second heading data. In various embodiments, the derived heading data may be a direction for a shortest distance line between the matched location and the location associated the road object observation. Further, a direction perpendicular to the derived heading data may be determined as the second heading data.

Various embodiments are provided for identifying the road object based on the first heading data and the second heading data such that the identified road object is either determined as associated with the first link or is determined to be not associated with the first link. In various embodiments, a minimum heading difference data may be determined for identifying the road object. Further, if the minimum heading difference is greater than a threshold heading difference data, then the identified road object is determined as the road object associated with the first link.

In various embodiments, the road object associated with the first link may be used to accurately provide navigation functions. Some non-limiting examples of the navigation functions may include providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

A system, a method and a computer programmable product are provided in accordance with an example embodiment described herein for identifying a road object.

In one aspect, a system for identifying a road object is disclosed. The system may comprise a memory configured to store computer-executable instructions; and one or more processors configured to execute the instructions to: receive a road object observation associated with the road object for a first link, wherein the first link is associated with at least one second link; determine a first heading data for the received road object observation; determine a matched location for the received road object observation on the at least one second link; determine a second heading data for the received road object observation, based on the determined matched location; and identify the road object as the road object based on the determined first heading data and the determined second heading data, wherein as a result of identifying, the identified road object is either determined as associated with the first link or is determined to be not associated with the first link.

According to some embodiments, the one or more processors may be further configured to: determine a plurality of shape locations associated with the at least one second link; divide the at least one second link into a plurality of shape segments, based on the plurality of shape locations; determine a first closest location for the received road object observation on each of the plurality of shape segments such that a distance between the received road object observation and the first closest location on each of the plurality of shape segments is a shortest distance in comparison to any other location on each of the corresponding plurality of shape segments; and determine a second closest location among the determined first closest location on each of the plurality of shape segments as the matched location, wherein for the second closest location the shortest distance is smallest among the determined shortest distances for each of the plurality of shape segments.

According to some embodiments, the first closest location on a shape segment of the plurality of shape segments may be a scalar projection of the received road object observation on the shape segment of the plurality of shape segments.

According to some embodiments, the one or more processors are further configured to: determine a set of candidate links associated with the first link; determine a candidate matched location on each link in the set of candidate links; determine a set of candidate distances comprising a candidate distance between each candidate matched location and a location of the road object observation; determine a shortest distance from the set of candidate distances, wherein the shortest distance corresponds to a value of the candidate distance which is smallest among all the candidate distances in the set of candidate distances; determine the at least one second link as the candidate link from the set of candidate links which is associated with the determined shortest distance; and determine the second heading data based on the at least one second link.

According to some embodiments, the one or more processors may be further configured to: determine a derived heading data for the road object observation, based on the determined matched location; determine a third heading data for the road object observation, based on the derived heading data; and determine a fourth heading data for the road object observation, based on the derived heading data.

According to some embodiments, the one or more processors may be further configured to: determine a first heading difference data for the road object observation, based on the first heading data and the third heading data; determine a second heading difference data for the road object observation, based on the first heading data and the fourth heading data; determine a minimum heading difference data among the first heading difference data and the second heading difference data; determine whether the minimum heading difference data is greater than a threshold heading difference data; and identify the road object, in response to determining the minimum heading difference data is greater than the threshold heading difference data.

According to some embodiments, the one or more processors may be further configured to: determine a first distance between a start location of the at least one second link and the location associated with the received road object observation; determine a second distance between the determined matched location of the at least one second link and the location associated with the received road object observation; and identify the road object based on the first distance, the second distance, the first heading data and the second heading data, wherein as a result of identifying, the identified road object is either determined as associated with the first link or is determined to be not associated with the first link.

According to some embodiments, the one or more processors may be further configured to update a map database, based on the identified road object.

According to some embodiments, the first heading data may comprise heading data associated with the road object.

In another aspect, a method for identifying a road object is disclosed. The method may comprise receiving a road object observation associated with the road object for a first link, wherein the first link is associated with at least one second link; determining a first heading data for the received road object observation; determining a matched location for the received road object observation on the at least one second link; determining a second heading data for the received road object observation, based on the determined matched location; and identifying the road object based on the determined first heading data and the determined second heading data, wherein as a result of identifying, the identified road object is either determined as associated with the first link or is determined to be not associated with the first link.

According to some embodiments, the method may further comprise: determining a plurality of shape locations associated with the at least one second link; dividing the at least one second link into a plurality of shape segments, based on the plurality of shape locations; determining a first closest location for the received road object observation on each of the plurality of shape segments such that a distance between the received road object observation and the first closest location on each of the plurality of shape segments is a shortest distance in comparison to any other location on each of the corresponding plurality of shape segments; and determining a second closest location among the determined first closest location on each of the plurality of shape segments as the matched location, wherein for the second closest location the shortest distance is smallest among the determined shortest distances for each of the plurality of shape segments.

According to some embodiments, the first closest location on a shape segment of the plurality of shape segments may be a scalar projection of the received road object observation on the shape segment of the plurality of shape segments.

According to some embodiments, the method may further comprise: determining a set of candidate links associated with the first link; determining a candidate matched location on each link in the set of candidate links; determining a set of candidate distances comprising a candidate distance between each candidate matched location and a location of the road object observation; determining a shortest distance from the set of candidate distances, wherein the shortest distance corresponds to a value of the candidate distance which is smallest among all the candidate distances in the set of candidate distances; determining the at least one second link as the candidate link from the set of candidate links which is associated with the determined shortest distance; and determining the second heading data based on the determined at least one second link.

According to some embodiments, the method may further comprise: determining a derived heading data for the road object observation, based on the determined matched location; determining a third heading data for the road object observation, based on the derived heading; and determining a fourth heading data for the road object observation, based on the derived heading data.

According to some embodiments, the method may further comprise: determining a first heading difference data for the road object observation, based on the first heading data and the third heading data; determining a second heading difference data for the road object observation, based on the first heading data and the fourth heading data; determining a minimum heading difference data among the first heading difference data and the second heading difference data; determining whether the minimum heading difference data is greater than a threshold heading difference data; and identifying the road object, in response to determining the minimum heading difference data is greater than the threshold heading difference data.

According to some embodiments, the method may further comprise: determining a first distance between a start location of the candidate link and a location associated with the received road object observation; determining a second distance between the determined matched location on the at least one second link and the location associated with the received road object observation; and identifying the road object as the road object associated with the first link or the road object not associated with the first link, based on the first distance, the second distance, the first heading data and the second heading data.

According to some embodiments, the method may further comprise updating a map database, based on the identified road object.

According to some embodiments, the first heading data may comprise heading data associated with the road object.

In yet another aspect, a computer program product comprising a non-transitory computer readable medium having stored thereon computer executable instruction which when executed by one or more processors, cause the one or more processors to carry out operations for identifying a road object, the operations comprising: receiving a road object observation associated with the road object for a first link, wherein the first link is associated with at least one second link; determining a first heading data for the received road object observation; determining a matched location for the received road object observation on the at least one second link; determining a second heading data for the received road object observation, based on the determined matched location; and identifying the road object based on the determined first heading data and the determined second heading data, wherein as a result of identifying, the identified road object is either determined as associated with the first link or is determined to be not associated with the first link.

According to some embodiments, the operations may further comprise: determining a plurality of shape locations associated with the at least one second link; dividing the at least one second link into a plurality of shape segments, based on the plurality of shape locations; determining a first closest location for the received road object observation on each of the plurality of shape segments such that a distance between the received road object observation and the first closest location on each of the plurality of shape segments is a shortest distance in comparison to any other location on each of the corresponding plurality of shape segments; and determining a second closest location among the determined first closest location on each of the plurality of shape segments as the matched location, wherein for the second closest location the shortest distance is smallest among the determined shortest distances for each of the plurality of shape segments.

According to some embodiments, the operations may further comprise: determining a derived heading data for the road object observation, based on the determined matched location; determining a third heading data for the road object observation, based on the derived heading data; and determining a fourth heading data for the road object observation, based on the derived heading.

According to some embodiments, the operations may further comprise: determining a second heading difference data for the road object observation, based on the first heading data and the fourth heading data; determining a minimum heading difference data among the first heading difference data and the second heading difference data; determining whether the minimum heading difference data is greater than a threshold heading difference data; and identifying the road object, in response to determining the minimum heading difference data is greater than the threshold heading difference data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
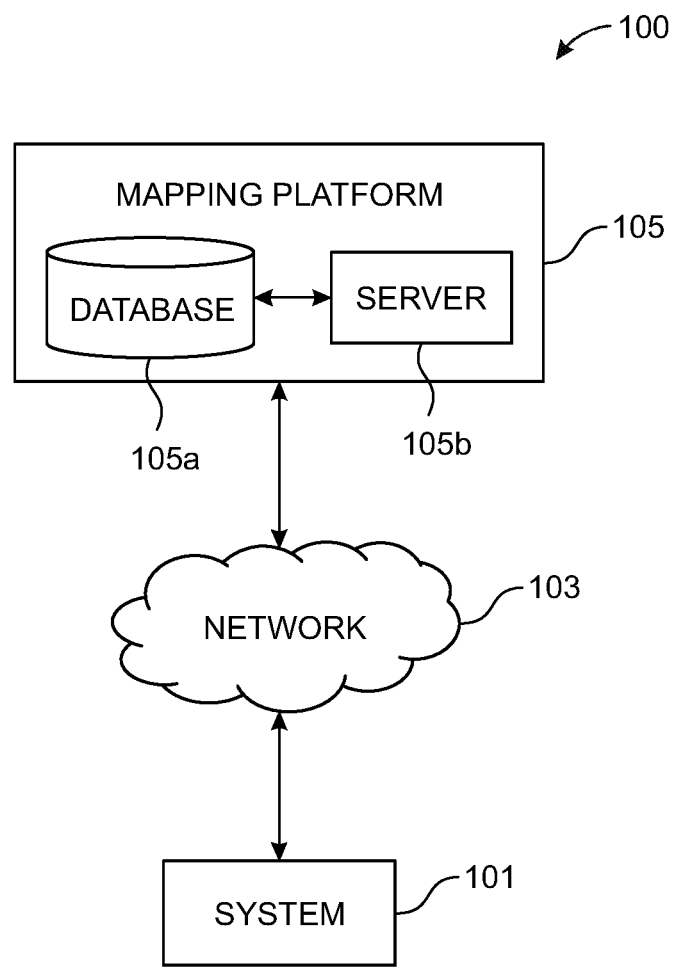
Figure 2:
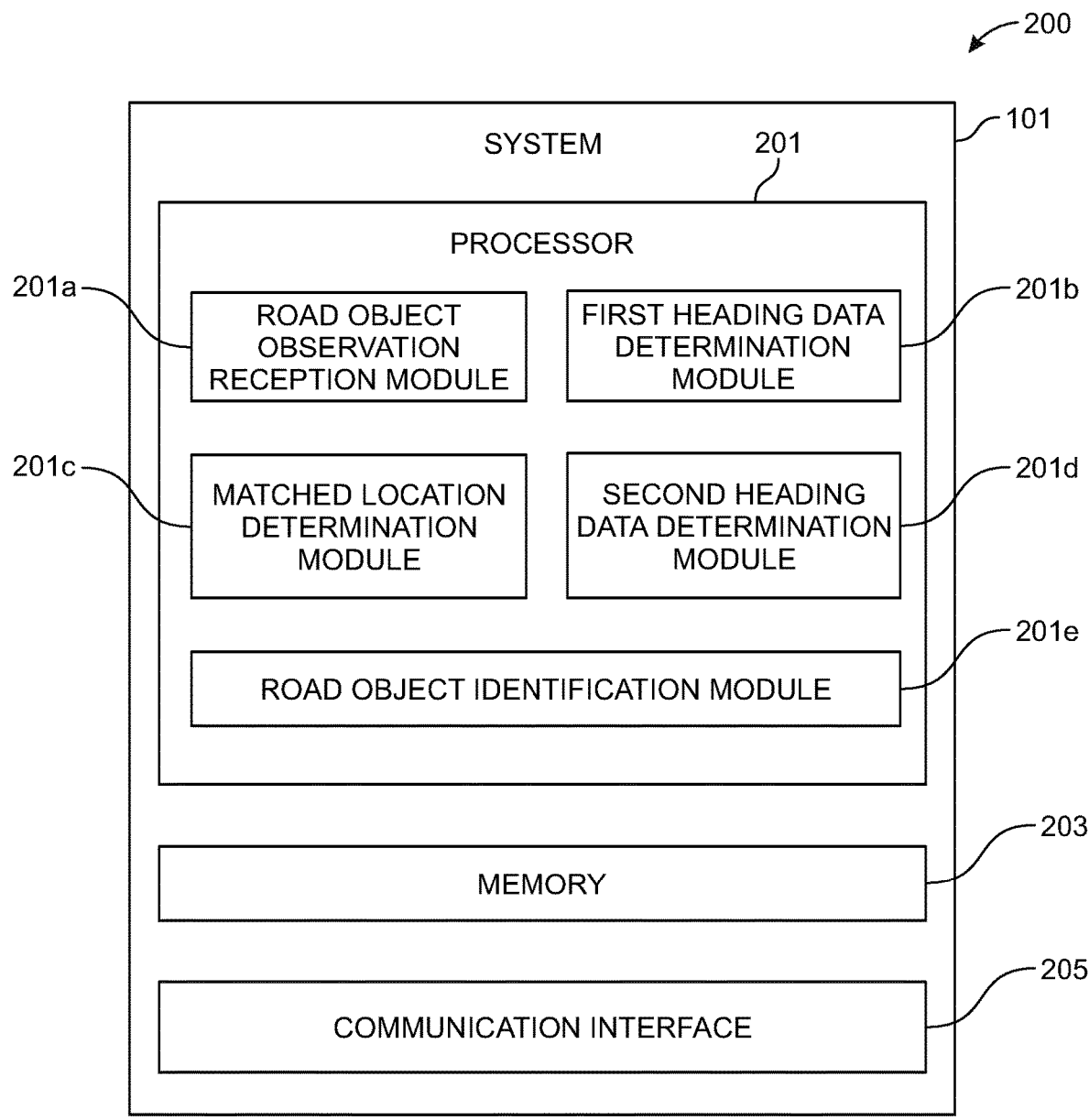
Figure 3A:
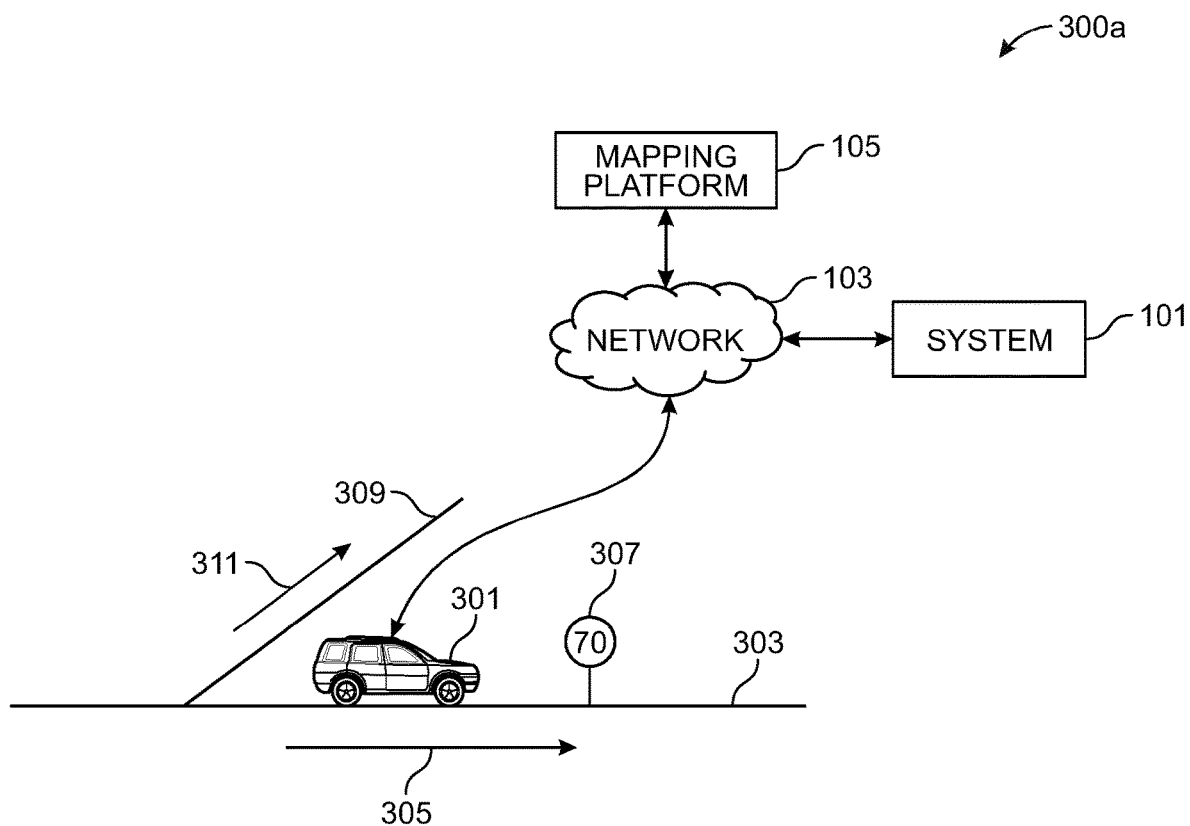
Figure 3B:
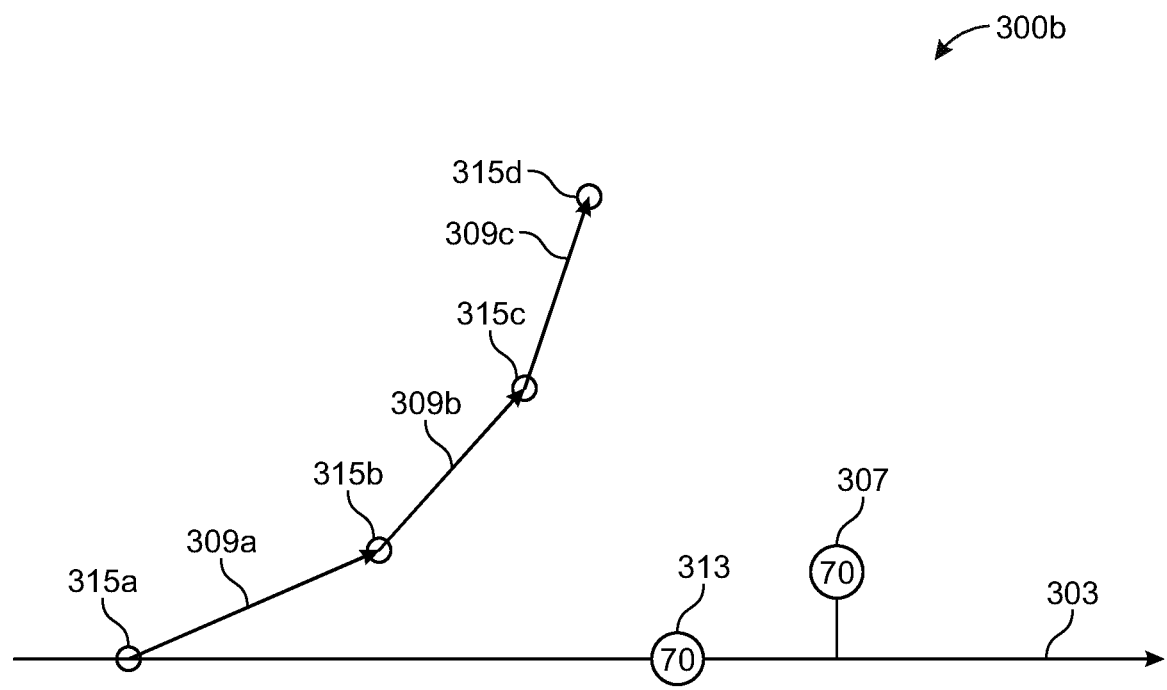
Figure 3C:
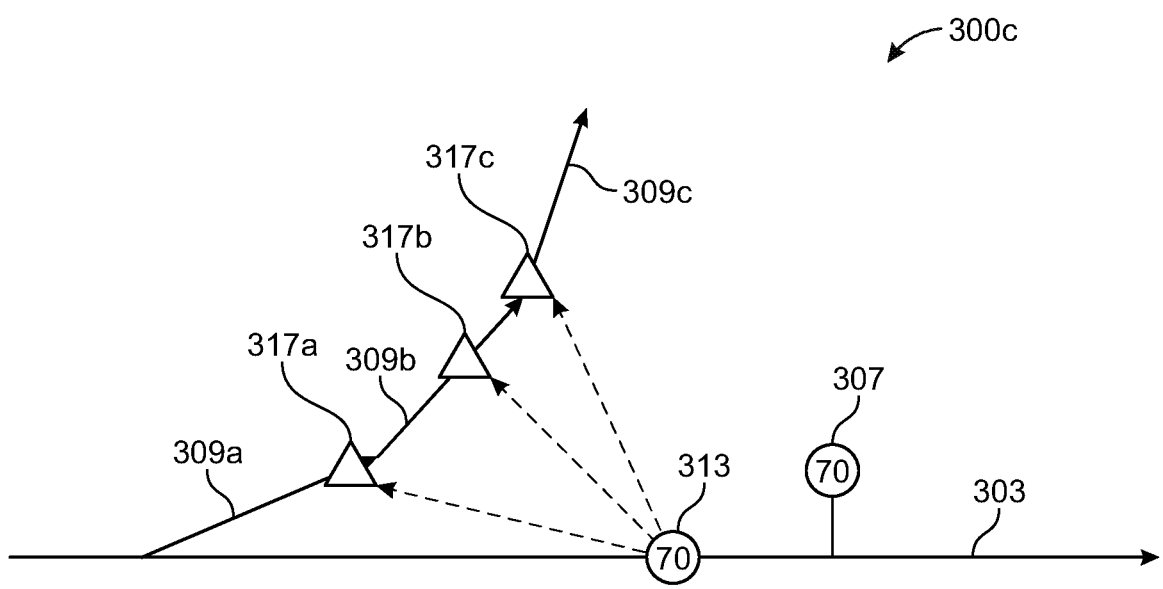
Figure 3D:
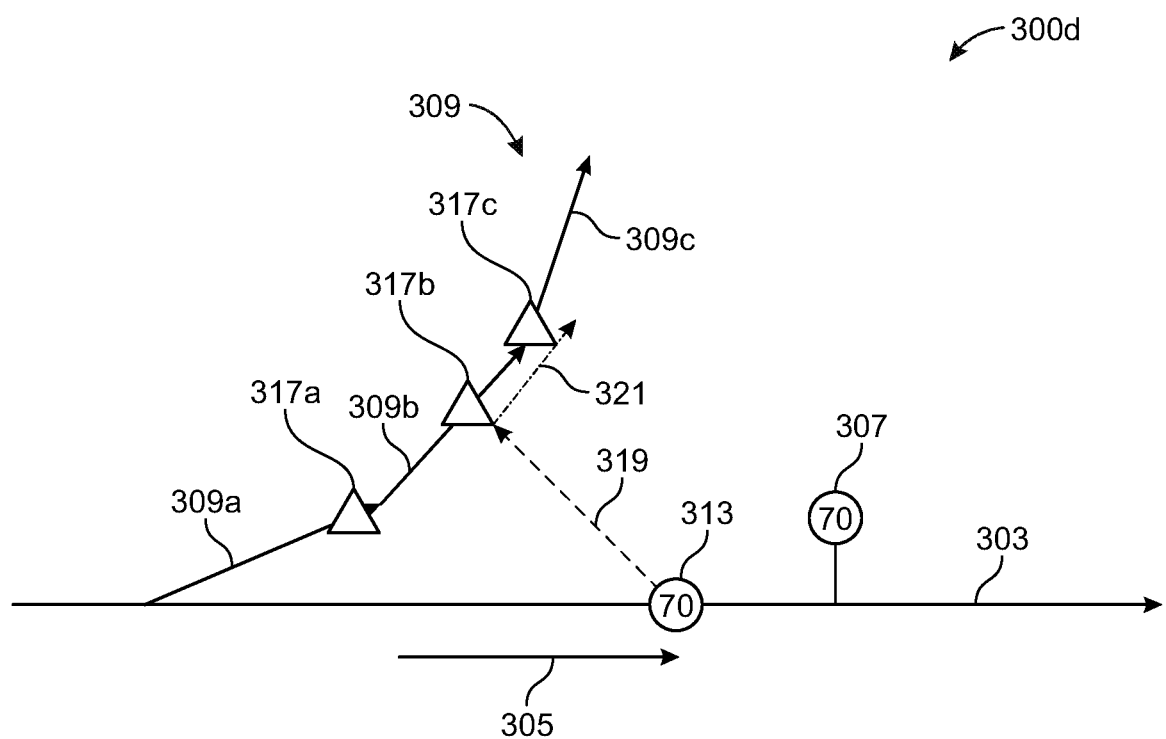
Figure 4A:
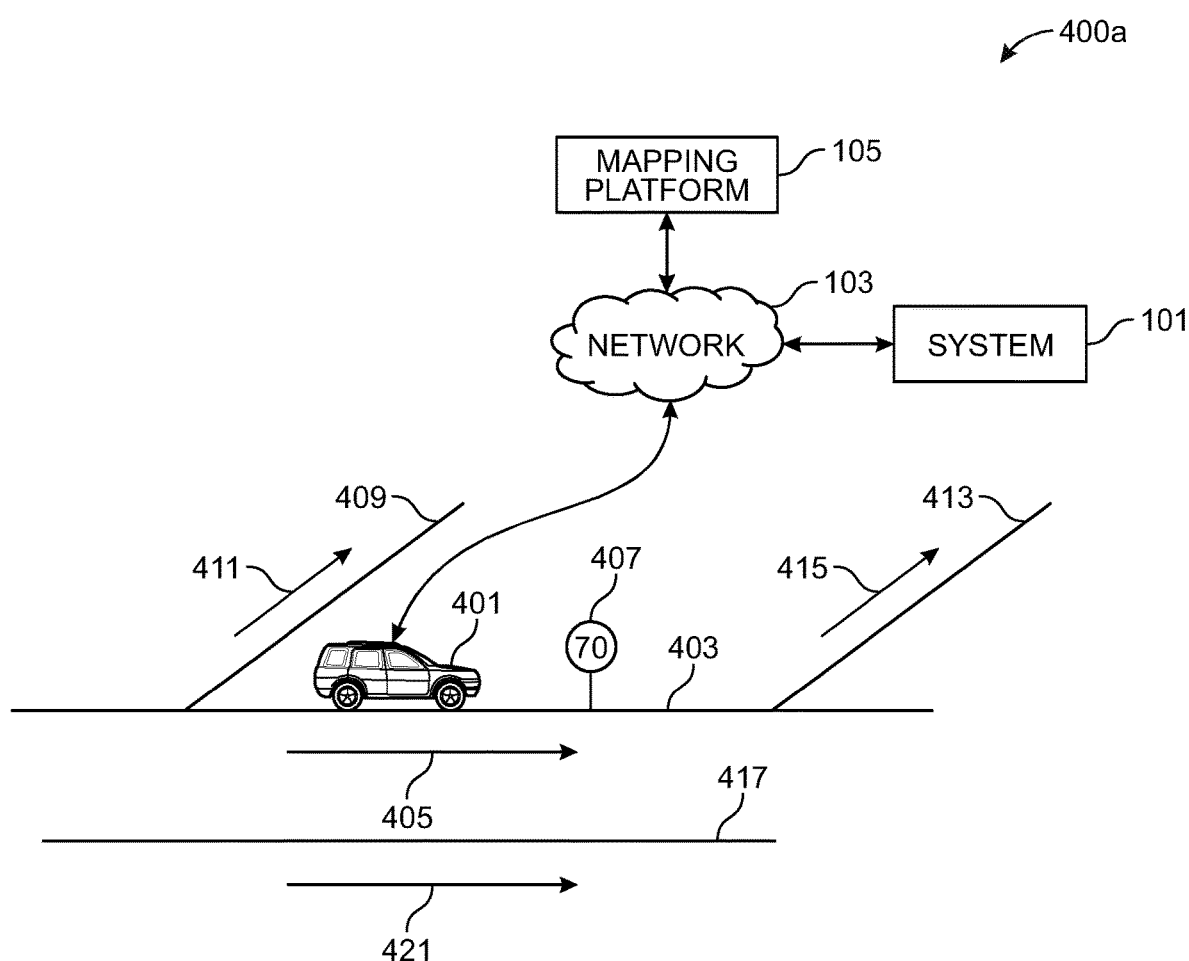
Figure 4B:
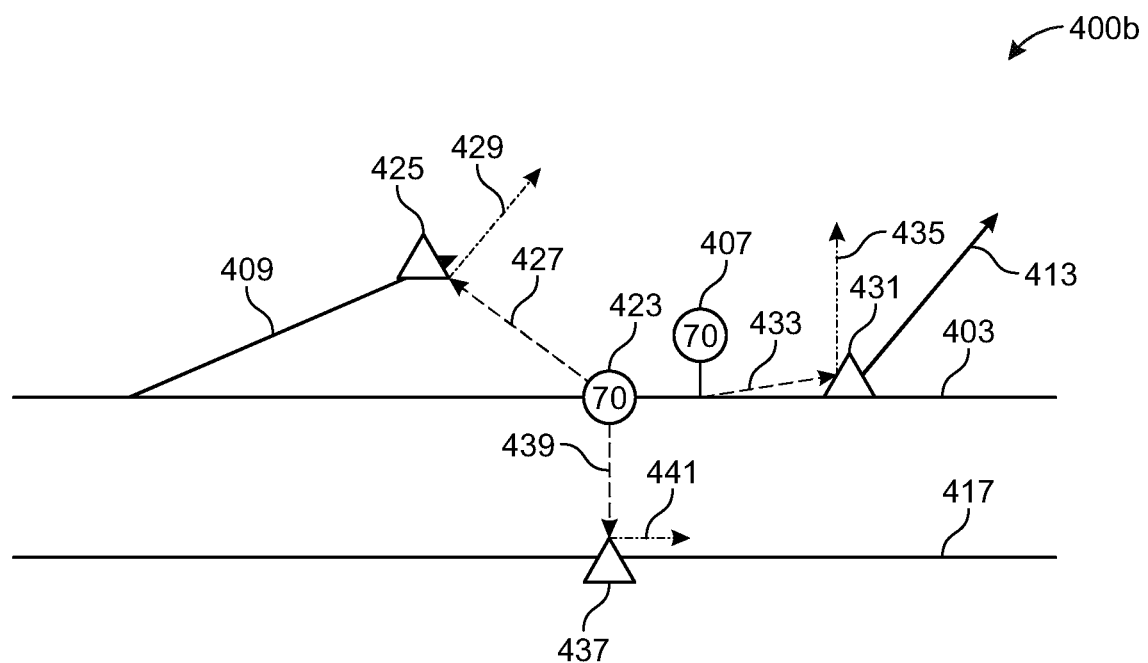
Figure 5A:
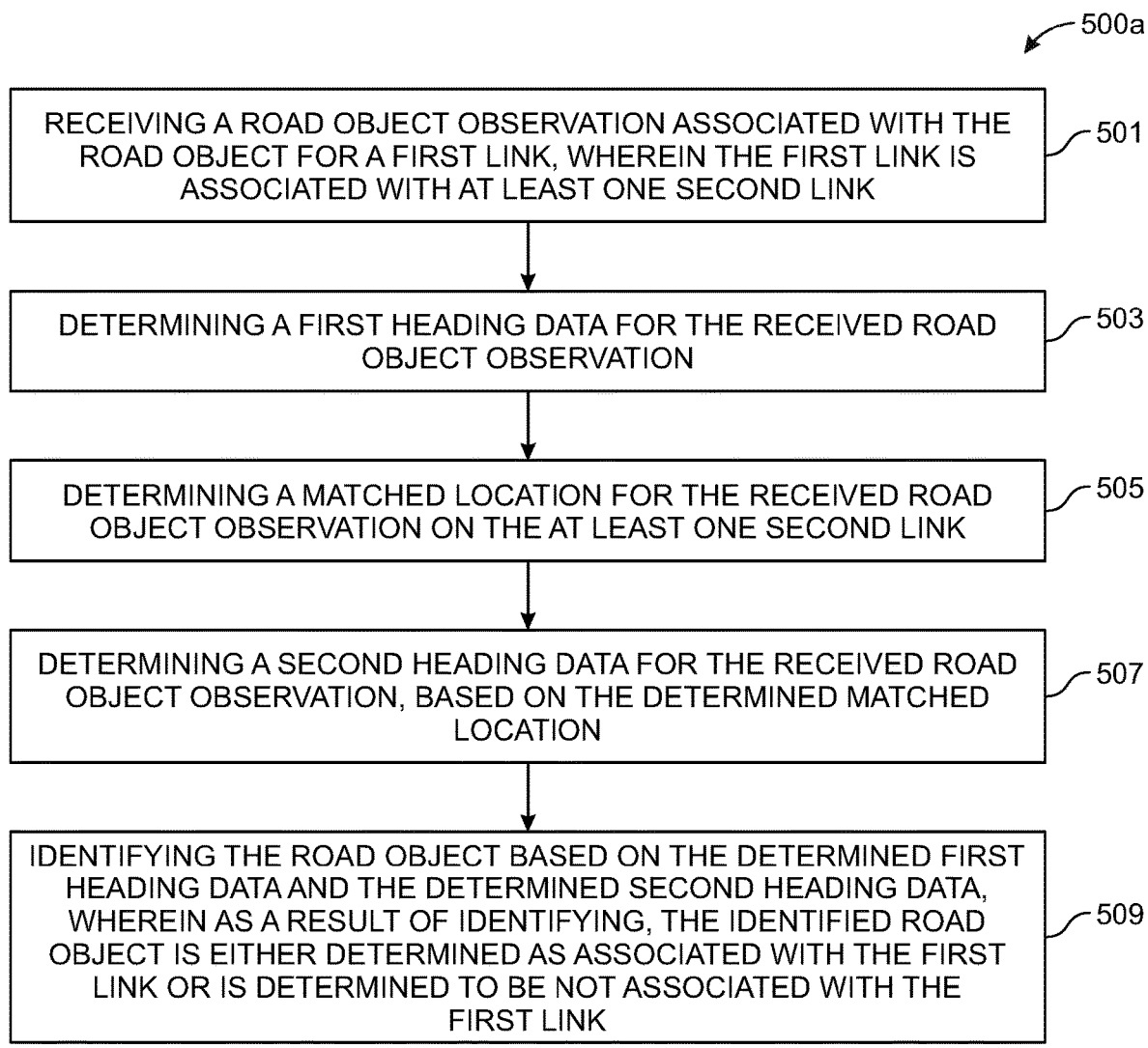
Figure 5B:
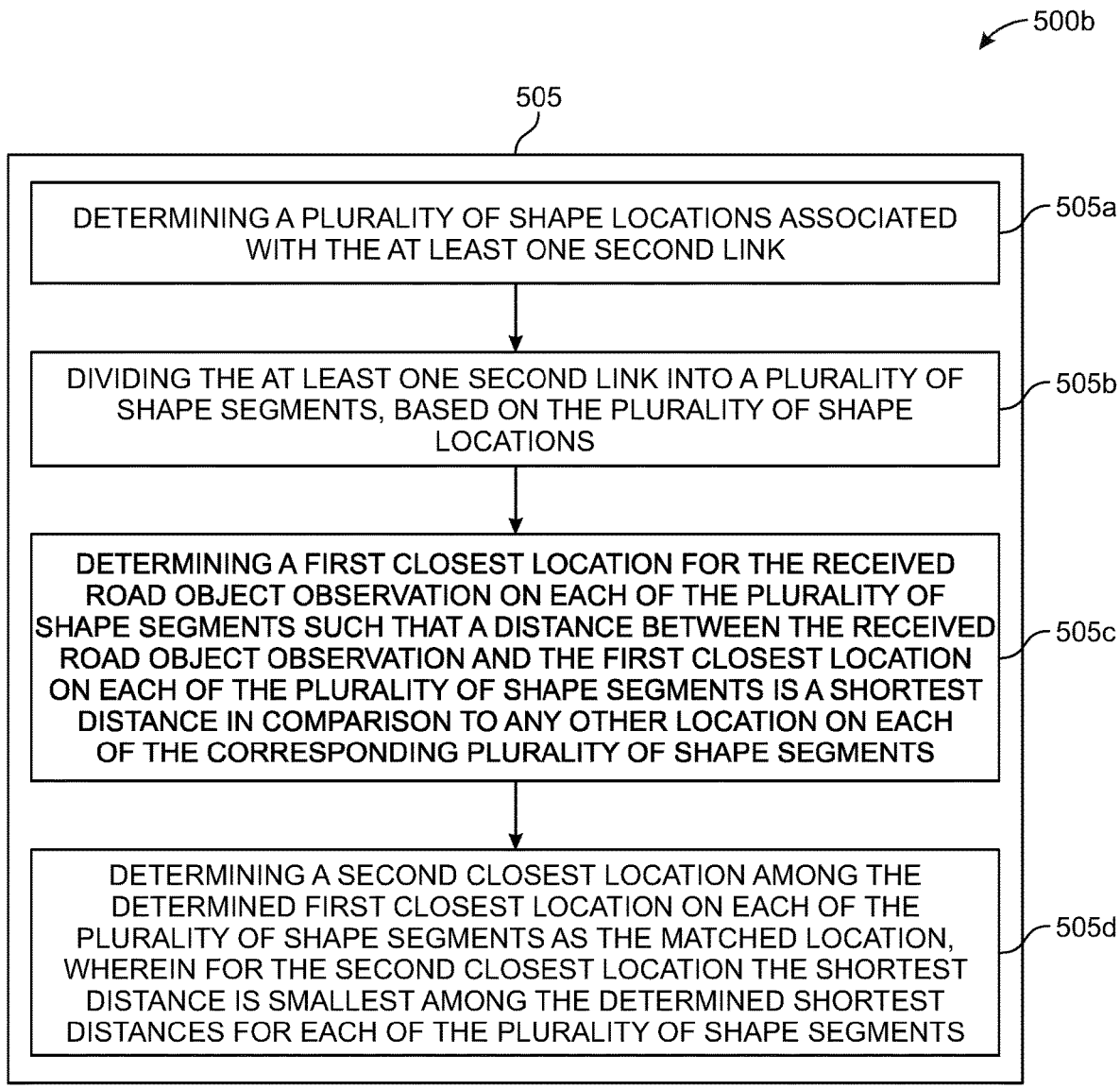
Figure 5C:
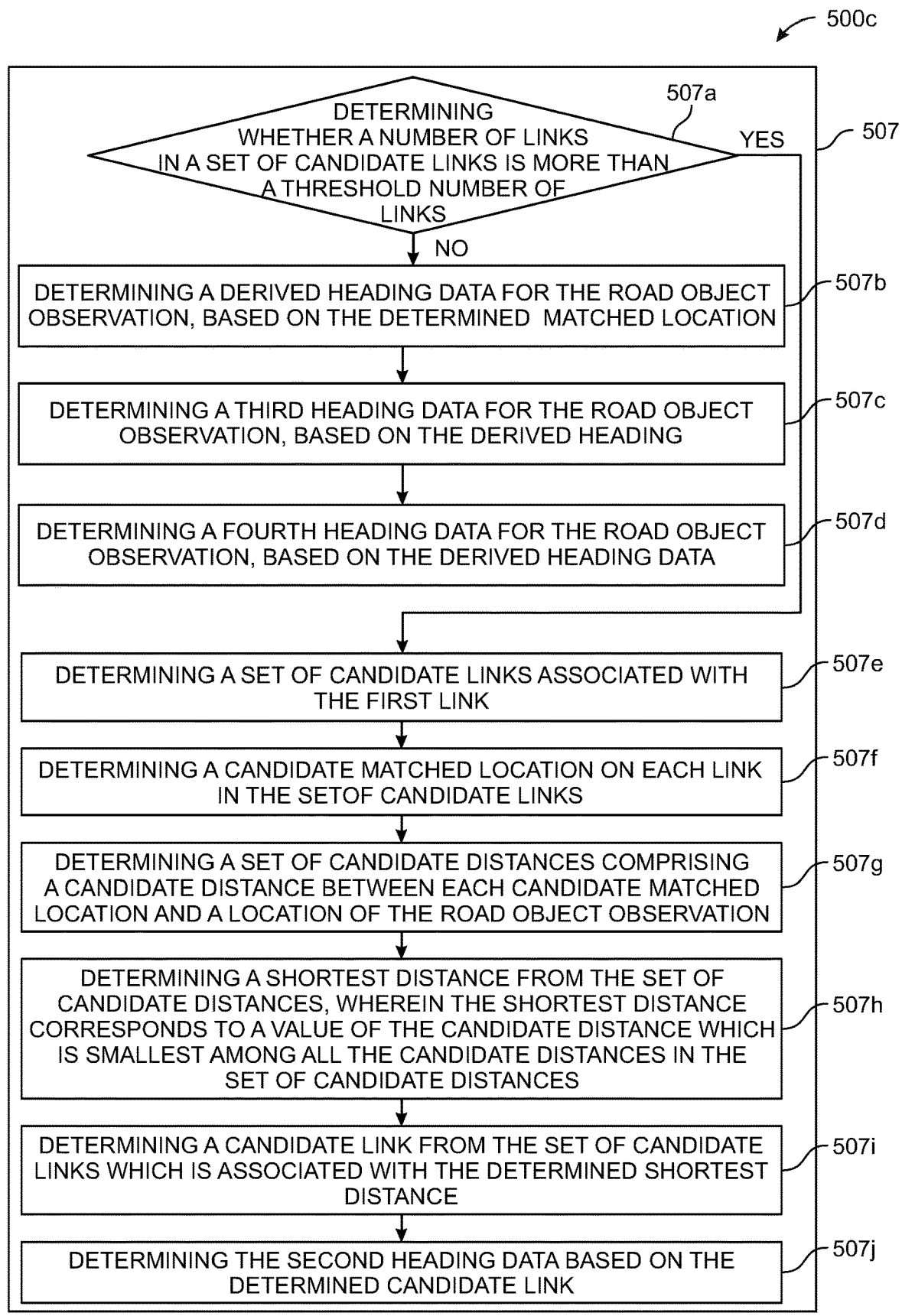
Figure 5D:
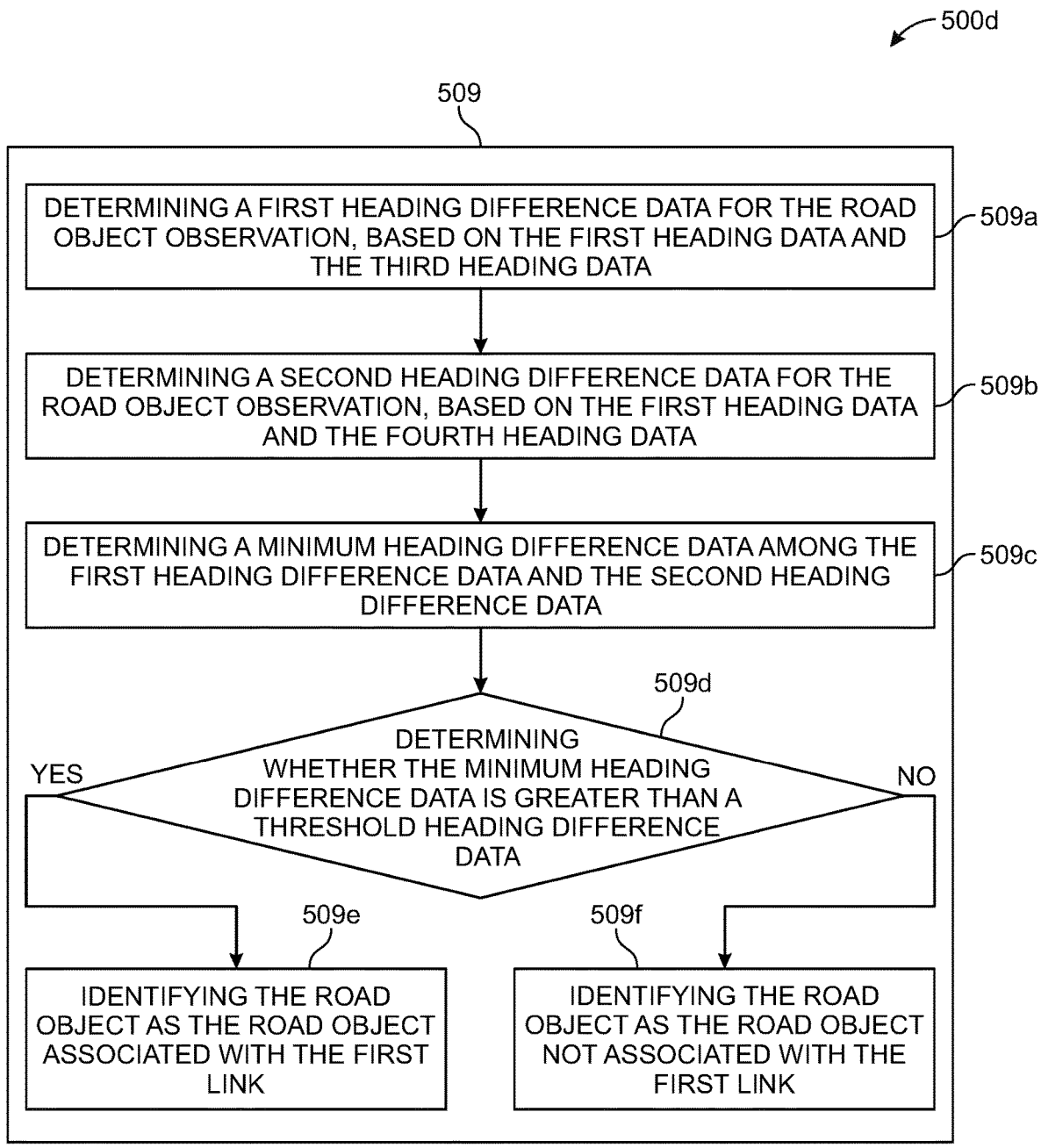
Figure 5E:
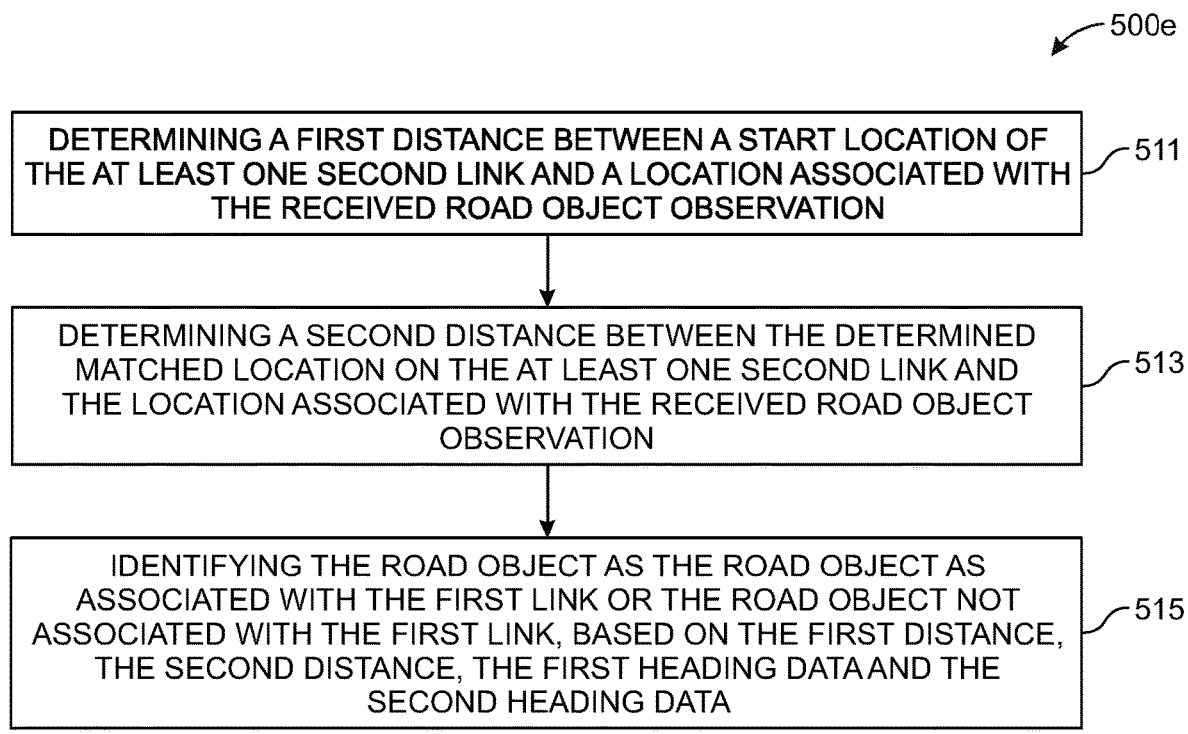

Having thus described example embodiments of the invention in general terms, reference will now be made to the accompanying drawings, which are not necessarily drawn to scale, and wherein:

FIG. 1 illustrates a block diagram showing an example architecture of a system for identifying a road object, in accordance with one or more example embodiments;

FIG. 2 illustrates a block diagram of the system for identifying the road object, in accordance with one or more example embodiments;

FIG. 3A illustrates a schematic diagram of an exemplary working environment of the system exemplarily illustrated in FIG. 2, in accordance with one or more example embodiments;

FIG. 3B illustrates a schematic diagram for an exemplary scenario for receiving road object observation, in accordance with one or more example embodiments;

FIG. 3C illustrates a schematic diagram for determining a matched location, in accordance with one or more example embodiments;

FIG. 3D illustrates a schematic diagram for determining a second heading data, in accordance with one or more example embodiments;

FIG. 4A illustrates a schematic diagram of an exemplary working environment of the system for identifying the road object, when a first link is associated with more than one second link, in accordance with one or more example embodiments;

FIG. 4B illustrates a schematic diagram for identifying the road object, in accordance with one or more example embodiments;

FIG. 5A illustrates a flowchart depicting a method for identifying the road object, in accordance with one or more example embodiments;

FIG. 5B illustrates a flowchart depicting a method for determining the matched location, in accordance with one or more example embodiments;

FIG. 5C illustrates a flowchart depicting a method for determining the second heading data, in accordance with one or more example embodiments;

FIG. 5D illustrates a flowchart depicting a method for identifying the road object as the road object associated with the first link or not associated with the first link, in accordance with one or more example embodiments; and FIG. 5E illustrates a flowchart depicting a method for identifying the road object based on a first distance, a second distance, the first heading data and the second heading data, in accordance with one or more example embodiments.

DETAILED DESCRIPTION

In the following description, for purposes of explanation, numerous specific details are set forth to provide a thorough understanding of the present disclosure. It will be apparent, however, to one skilled in the art that the present disclosure may be practiced without these specific details. In other instances, apparatuses and methods are shown in block diagram form only to avoid obscuring the present disclosure.

Reference in this specification to "one embodiment" or "an embodiment" means that a feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A system, a method, and a computer program product are provided for identifying a road object. Various embodiments are provided for receiving a road object observation associated with a road object for a first link. In various embodiments, the first link may be associated with at least one second link. In various embodiments, the road object observation may comprise a location of the vehicle at where the road object observation was made and road object information of the road object. Additionally, the road object observation may comprise timestamp data indicating a time instance (also includes date, month, and year) at which the road object observation was made. As used herein, the first link may refer to a road segment between two nodes. In various embodiments, the first link may be a freeway, a highway, an expressway, and the like. As used herein, the second link may refer to a road segment between two nodes. In various embodiments, the second link may be a ramp link, a parallel link, a merging link, and the like. In various embodiments, the road object may comprise a road sign, a traffic object, a road obstacle, a traffic cone, a guardrail, a gantry, and the like.

Various embodiments are provided for determining a first heading data for the received road object observation. In various embodiments, the first heading data may comprise the heading data associated with the road object. As used herein, the heading data may be a direction data for the road object and may be measured relative to a north direction or a line-of-sight direction.

Various embodiments are provided for determining a matched location for the road object observation on the at least one second link. In various embodiments, the matched location may be a location on the at least one second link such that a distance between that location and a location associated with the road object observation is shortest distance in comparison to any other location on the at least one second link. In some example embodiments, the matched location may be obtained by dropping a scalar projection of the road object observation on the at least one second link.

Various embodiments are provided for determining a second heading data for the road object observation, based on the matched location. In various embodiments, a derived heading data may be determined based on the matched location for determining the second heading data. In various embodiments, the derived heading data may be a direction associated with a shortest distance line between the matched location and the location associated the road object observation. Further, a direction perpendicular to the derived heading data may be determined as the second heading data.

Various embodiments are provided for identifying the road object based on the first heading data and the second heading data such that the identified road object is either determined as associated with the first link or is determined to be not associated with the first link. In various embodiments, a minimum heading difference data may be determined for identifying the road object. Further, if the minimum heading difference is greater than a threshold heading difference data, then the identified road object is determined as the road object associated with the first link.

In various embodiments, the road object associated with the first link may be used to accurately provide navigation functions. Some non-limiting examples of the navigation functions may include providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

FIG. 1 illustrates a block diagram 100 showing an exemplary architecture of a system 101 for identifying a road object, in accordance with one or more example embodiments. As illustrated in FIG. 1, the block diagram 100 may comprise the system 101, a network 103, and a mapping platform 105. The mapping platform 105 may further comprise a map database 105a (also referred to as a database 105a) and a server 105b. In various embodiments, the system 101 may be an (Original Equipment Manufacturer) OEM cloud. To that end, the system 101 may be a server (for instance, a backend server, a remotely located server, or the like), group of servers, distributed computing system, and/or other computing system. In some embodiments, the system 101 may be onboard a vehicle, such as the system 101 may be a navigation system installed in the vehicle. In various embodiments, the vehicle may be an autonomous vehicle, a semiautonomous vehicle, or a manual vehicle. In an embodiment, the system 101 may be the server 105b of the mapping platform 105 and therefore may be co-located with or within the mapping platform 105. The system 101 may be communicatively coupled with the mapping platform 105 over the network 103.

The network 103 may be wired, wireless, or any combination of wired and wireless communication networks, such as cellular, Wi-Fi, internet, local area networks, or the like. In some embodiments, the network 103 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The system 101 may communicate with the mapping platform 105, via the network 103, where the mapping platform 105 may comprise the map database 105a for storing map data, and the processing server 105b for carrying out the processing functions associated with the mapping platform 105. The map database 105a may store node data, road segment data or link data, point of interest (POI) data, road obstacles related data, traffic objects related data, posted signs related data, such as road sign data, lane level data or the like. The map database 105a may also include cartographic data and/or routing data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road/link data and the node data may represent a road network, such as used by vehicles, for example, cars, trucks, buses, motorcycles, and/or other entities.

Optionally, the map database 105a may contain path segment and node data records or other data that may represent pedestrian paths or areas in addition to or instead of the vehicle road record data, for example. The road/link segments and nodes may be associated with attributes, such as geographic coordinates, street names, address ranges, lane level speed profile (historically derived speed limits for a lane), lane level maneuver pattern (lane change patterns at intersections), and other navigation related attributes, as well as POIs, such as fueling stations, hotels, restaurants, museums, stadiums, offices, auto repair shops, buildings, stores, parks, etc. The map database 105a may include data about the POIs and their respective locations in the POI records. The map database 105a may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 105a may include event data (e.g., traffic incidents, construction activities, scheduled events, unscheduled events, etc.) associated with the POI data records or other records of the map database 105a. The map database 105a may additionally include data related to road signs, road obstacles, traffic objects and the like. The map database may be communicatively coupled to the processing server 105b.

The processing server 105b may comprise processing means, and communication means. For example, the processing means may comprise one or more processors configured to process requests received from the system 101. The processing means may fetch map data from the map database 105a and transmit the same to the system 101 in a format suitable for use by the system 101. In some example embodiments, as disclosed in conjunction with the various embodiments disclosed herein, the system 101 may be used to identify the road object.

FIG. 2 illustrates a block diagram 200 of the system 101 for identifying the road object, in accordance with one or more example embodiments. The system 101 may include a processing means such as at least one processor 201, storage means such as a memory 203, and a communication means such as at least one communication interface 205. Further, the system 101 may comprise a road object observation reception module 201a, a first heading data determination module 201b, a matched location determination module 201c, a second heading data determination module 201d, and a road object identification module 201e. In various embodiments, the road object observation reception module 201a may be configured to receive a road object observation associated with a road object for a first link. In various embodiments, the first heading data determination module 201b may be configured to determine a first heading data for the road object observation received by the road object observation reception module 201a. In various embodiments, the matched location determination module 201c may be configured to determine a matched location on at least one second link for the road object observation received by the road object observation reception module 201a. In various embodiments, the second heading data determination module 201d may be configured to determine a second heading data for the road object observation, based on the matched location determined by the matched location determination module 201c. In various embodiments, the road object identification module 201e may be configured to identify the road object such that the identified road object is determined as associated with the first link or is determined to be not associated with the first link, based on the first heading data determined by the first heading data determination module 201b and the second heading data determined by the second heading data determination module 201d.

According to some embodiments, each of the modules 201a, 201b, 201c, 201d, and 201e may be embodied in the processor 201. The processor 201 may retrieve computer program code instructions that may be stored in the memory 203 for execution of computer program code instructions, which may be configured for identifying the road object.

The processor 201 may be embodied in several different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

Additionally, or alternatively, the processor 201 may include one or more processors capable of processing large volumes of workloads and operations to provide support for big data analysis. In an example embodiment, the processor 201 may be in communication with a memory 203 via a bus for passing information among components of structure 100. The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the system 101 to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

In some embodiments, the processor 201 may be configured to provide Internet-of-Things (IoT) related capabilities to users of the system 101, where the users may be a traveler, a rider, a pedestrian, a driver of the vehicle and the like. In some embodiments, the users may be or correspond to an autonomous or semi-autonomous vehicle. The IoT related capabilities may in turn be used to provide smart navigation solutions by providing real time updates to the users to take pro-active decision on speed determination, lane-level speed determination, turn-maneuvers, lane changes, overtaking, merging and the like, big data analysis, and sensor-based data collection by using the cloud based mapping system for providing navigation recommendation services to the users. The system 101 may be accessed using the communication interface 205. The communication interface 205 may provide an interface for accessing various features and data stored in the system 101. For example, the communication interface may comprise I/O interface which may be in the form of a GUI, a touch interface, a voice enabled interface, a keypad, and the like. For example, the communication interface may be a touch enabled interface of a navigation device installed in a vehicle, which may also display various navigation related data to the user of the vehicle. Such navigation related data may include information about upcoming conditions on a route, route display, alerts about vehicle speed, user assistance while driving and the like.

FIG. 3A illustrates a schematic diagram 300a of an exemplary working environment of the system 101 exemplarily illustrated in FIG. 2, in accordance with one or more example embodiments. As illustrated in FIG. 3A, the schematic diagram 300a may comprise the system 101, the network 103, the mapping platform 105, a vehicle 301, a first link 303, a travel direction 305 associated with the first link 303, a road object 307, at least one second link 309 associated with the first link 303, and a travel direction 311 associated with the at least one second link 309. In various embodiments, the vehicle 301 may be an autonomous vehicle, a semiautonomous vehicle, or a manual vehicle. In various embodiments, the vehicle 301 may be equipped with sensors such as a camera sensor, a RADAR sensor, a LIDAR sensor and like for collecting road object observations for the road objects (for instance, the road object 307) on the first link 303, when travelling through the first link 303 in the travel direction 305. As used herein, the first link 303 may refer to a road segment between two nodes or two intersections. As used herein, a travel direction 305 may refer to a direction of travel of vehicles such as the vehicle 301 on the first link 303. In various embodiments, the first link 303 may be a current map-matched link, when the vehicle 301 is travelling through the first link 303. For instance, the system 101 may constantly obtain location data (GPS (Global positioning system) coordinate data) of the vehicle 301 and map-match the obtained location data with the map data of the map-database 105a to determine the first link 303 as the current map-matched link, when the vehicle 301 is traveling on the first link 303. In various embodiments, the first link 303 may correspond to a freeway, a highway, an expressway, and the like. In various embodiments, the first link 303 may be associated with or connected to the at least one second link 309 having the travel direction 311. In various embodiments, the at least one second link 309 may be a road segment between two nodes or two intersections. In various embodiments, the at least one second link 309 may correspond to a ramp link (preferably, exit ramp link), a merging link, a parallel link, and the like associated with or connected to the first link 303 such as freeway, highway and the like. The ramp link may include a link which is connected to the first link 303 and is diverging from or merging into the first link 303. Further, the ramp link may have a travel direction similar to the travel direction 305 of the first link 303. As used herein, the travel direction 311 may refer to a direction of travel of vehicles such as the vehicle 301 on the at least one second link 309.

In various embodiments, the first link 303 and the at least one second link 309 may comprise one or more road objects such as the road object 307. In various embodiments, the road object 307 may comprise at least one of a road signs, a road obstacle, a traffic object, and the like. In various embodiments, the road sign may comprise a speed limit sign, a route guidance sign, a parking sign, a destination sign, a warning sign, and the like. In various embodiments, the road obstacle may comprise a road divider, a road work object, and the like. In various embodiments, the traffic object may comprise a traffic cone, a guide rail, and the like.

In various embodiments, the vehicle 301 (i.e. the sensors of the vehicle 301) may collect road object observations associated with the road objects such as the road object 307 for the first link 303, when travelling through the first link 303. Indeed, the sensors of the vehicle 301 may be configured to collect the road object observations associated the road objects located within a threshold distance from a location of the vehicle 301. As a result, the sensors may wrongly collect the road object observations associated with the road objects located on the second link 309 for the first link 303, when the road objects located on the second link 309 are within the threshold distance. Therefore, the road object observations collected by the sensors of the vehicle 301 may not be accurate. To that end, the system 101 may be configured to identify the road object 307 such that the identified road object 307 is either determined as associated with the first link 303 or is determined to be not associated with the first link 303. Accordingly, the system 101 may be configured to receive, from the sensors of the vehicle 301, the road object observation associated with the road object 307 for the first link 303. Further, the road object observation received from the sensor of the vehicle 301 may be as explained in the detailed description of FIG. 3B.

FIG. 3B illustrates a schematic diagram 300b for an exemplary road object observation 313 and dividing the at least one second link 309 into a plurality of shape segments 309a, 309b, and 309c, in accordance with one or more example embodiments. In various embodiments, the system 101 may be configured to receive the road object observation 313 associated with the road object 307 for the first link 303. For instance, the road object observation reception module 201a may be configured to receive the road object observation 313 associated with the road object 307 for the first link 303. In various embodiments, the road object observation 313 may comprise a location of the vehicle 301 at where the road object observation 313 was made and road object information of the road object 307 (for instance, speed limit value of the speed limit sign). Additionally, the road object observation 313 may comprise timestamp data indicating a time instance (also includes date, month, and year) at which the road object observation 313 was made.

In various embodiments, the system 101 may be configured to determine a first heading data for the road object observation 313. For instance, the first heading data determination module 201b may be configured to determine the first heading data for the road object observation 313. In various embodiments, the system 101 may determine, using the map database 105a, a heading data associated with the road object 307; and determine the heading data associated with the road object 307 as the first heading data for the road object observation 313. To that end, the first heading data may comprise the heading data associated with the road object 307. As used herein, the heading data may be a direction for the road object 307 and may be measured relative to a north direction or a line-of-sight direction. In some example embodiments, the heading data may be an angle in degree, or its equivalent measured from the north direction or the line-of-sight direction in clockwise direction.

Further, the system 101 may be configured to determine a matched location for the road object observation 313 on the at least one second link 309. In various embodiments, the system 101 may determine whether the at least one second link 309 has a curved road geometry to determine the matched location for the road object observation 313 on the at least one second link 309. In response to determining the at least one second link 309 having the curved road geometry, the system 101 may be configured to determine a plurality of shape locations 315a, 315b, 315c, and 315d associated with the at least one second link 309. As used herein, the plurality of shape locations 315a, 315b, 315c, and 315d may be coordinate locations on the at least one second link 309 used to represent the curved road geometry of the at least one second link 309. In some embodiments, the system 101 may determine the plurality of shape locations 315a, 315b, 315c, and 315d associated with the at least one second link 309 using the map database 105a. To that end, the map database 105a may be configured to store the shape locations on a link or a road segment to represent curved road geometry of the link or the road segment, when the link or the road segment has the curved road geometry.

In various embodiments, the system 101 may be configured to divide the at least one second link 309 into a plurality of shape segments (also referred to as sub-links) 309a, 309b, and 309c, based on the plurality of shape locations 315a, 315b, 315c, and 315d. In some example embodiments, the system 101 may determine a road segment between two shape locations 315a and 315b as a shape segment 309a. Similarly, the system 101 may determine a shape segment 309b and the shape segment 309c. To that end, the at least one second link 309 may be divided into the plurality of shape segments 309a, 309b, and 309c, as illustrated in FIG. 3B. Further, the system 101 may determine the matched location for the road object observation 313 on the at least one second link 309 as explained in the detailed description of FIG. 3C.

FIG. 3C illustrates a schematic diagram 300c for determining the matched location for the road object observation 313 on the at least one second link 309, in accordance with one or more example embodiments. In various embodiments, the system 101 may be configured determine the matched location for the road object observation 313 on the at least one second link 309. For instance, the matched location determination module 201c may be configured to determine the matched location for the road object observation 313 on the at least one second link 309.

In various embodiments, the system 101 may be configured to determine a first closest location 317a for the road object observation 313 on the shape segment 309a. In various embodiments, the system 101 may determine a location on the shape segment 309a as the first closest 317a, if a distance between the location of the road object observation 313 and the determined location on the shape segment 309a correspond to a shortest distance in comparison to any other location on the shape segment 309a. In some example embodiments, the first closest location 317a may be a scalar projection of the road object observation 313 on the shape segment 309a. Similarly, the system 101 may be configured to determine a first closest location 317b on the shape segment 309b and a first closest location 317c on the shape segment 309c. To that end, the system 101 may determine the first closest locations 317a, 317b and 317c on the plurality of shape segments 309a, 309b, and 309c respectively such that the distances between the location of the road object observation 313 and the first closest locations 317a, 317b, and 317c is the shortest distances in comparison to any other location on the corresponding plurality of shape segments 309a, 309b, and 309c.

In various embodiments, the system 101 may be configured to determine a second closest location among the first closest location (317a, 317b, or 317c) on each of the plurality of the plurality of shape segments 309a, 309b and 309c as the matched location. In various embodiments, the system 101 may determine the second closest location among the first closest locations 317a, 317b, 317c such that the shortest distance between the location of the road object observation 313 and the second closest location is smallest among the shortest distances between the location of the road object observation 313 and the first closest locations 317a, 317b, and 317c. For instance, the system 101 may determine the first closest location 317b as the second closest location, if the shortest distance between the first closest location 317b and the location of the road object observation 313 is smallest among the shortest distances between the location of the road object observation 313 and the first closest locations 317a and 317c. In various embodiments, the determined second closest location may be the matched location for the road object observation 313 on the at least one second link 309. For instance, the first closest location 317b may be the matched location for the road object observation 313 on the at least one second link 309, if the first closest location 317b is determined as the second closest location.

In some example embodiments, when the at least one second link 309 does not have the curved road geometry, the system 101 may be configured to determine only one closest location (for instance, the first closest location 317b) for the road object observation 313 on the at least one second link 309. For instance, the system 101 may determine a location on the at least one second link 309 as the closest location, if a distance from the location of the road object observation 313 and the determined location on the at least one second link 309 is the shortest distance in comparison to any other location on the at least one second link 309. In various embodiments, the determined closest location (for instance, the first closest location 317b) may be the matched location for the road object observation 313 on the at least one second link 309. In this way, the system 101 may be configured to determine the matched location 317b for the road object observation 313 on the at least one second link 309. Here for easy of explanation, the first link 303 associated with only one second link 309 is considered for determining the matched location 317b. However, when the first link 303 is associated with more than one second link 309, the system 101 may be configured to determine the matched location 317b for each of the second links as explained with respect to the at least one second link 309. Further, the system 101 may determine a second heading data for the received object observation 313 as explained in the detailed description of FIG. 3D.

FIG. 3D illustrates a schematic diagram 300d for determining an exemplary second heading data 321 for the road object observation 313, in accordance with one or more example embodiments. In various embodiments, the system 101 may be configured to determine the second heading data 321 for the road object observation 313, based on the matched location 317b. For instance, the second heading data determination module 201d may be configured to determine the second heading data 321 for the road object observation 313, based on the matched location 317b.

In various embodiments, the system 101 may determine the at least one second link 309 from a set of candidate links associated with the first link 303 such that the set of candidate link comprises a number of candidate links which is more than a threshold number of links. In some example embodiments, the threshold number of links may be a value equal to unity. In some embodiments, the system 101 may be configured to determine the set of candidate links associated with the first link 303. In various embodiments, the system 101 may be configured to determine a candidate matched location (for instance, the matched location 317b) on each link in the set of candidate links. For instance, the system 101 may determine the candidate matched location on each link in the set of candidate links as explained in the detailed description of FIG. 3B and FIG. 3C. In various embodiments, the system 101 may be configured to determine a set of candidate distances. In various embodiments, the set of candidate distances comprises candidate distances between the candidate matched location and the location associated with the road object observation 313.

In various embodiments, the system 101 may be configured to determine a shortest distance from the set of candidate distances. In various embodiments, the shortest distance may correspond to a value of the candidate distance which is smallest among all the candidate distances in the set of candidate distances. In various embodiments, the system 101 may be configured to determine a candidate link from the set of candidate links which is associate with this shortest distance. In various embodiments, the candidate link determined from the set of candidate links as associated with the shortest distance is determined as the at least one second link. All further processing is then based on this determined at least one second link.

In some example embodiments, in response to determining the at least one second link 309 associated with the shortest distance the system 101 may determine the second link 309 as the candidate link and the matched location 417*b* as a candidate matched location 417*b*. Further, the matched location 317*b* may be referred the candidate matched location 3017*b*.

In various embodiments, the system 101 may be configured to determine a derived heading data 319 for determining the second heading data 321. To that end, the system 101 may be configured to determine the derived heading data 319 for the road object observation 313, based on the matched location 317*b* on the at least one second link 309 (i.e. the candidate link). In various embodiments, the system 101 may determine the derived heading data 319 as a direction for a shortest distance line between the location of the road object observation 313 and the matched location 317*b*. In some example embodiments, the derived heading data 319 may be determined relative to the north direction. For instance, the system 101 may determine the derived heading data 319 as an angle in degree or its equivalent in clock wise direction from the north direction to the shortest distance line between the location of the road object observation 313 and the matched location 317*b*.

Further, the system 101 may determine a direction perpendicular to the derived heading data 319 as the second heading data 321. Here for the purpose of explanation, the road object 307 is located on the first link 303 and the at least one second link 309 is associated with or connected to left side of the first link 303 are considered, however, the road object 307 may be located on the at least one second link 309 and the at least one second link 309 may be associated with or connected to right side of the first link 303. As used herein, the right side of the first link 303 and the left side of the first link 303 may be determined relative to the travel direction 305 associated with the first link 303. Indeed, the determination of the direction perpendicular (i.e. the second heading data 321) to the derived heading data 319 may be affected by four factors, for instance, whether the road object 307 is located on the first link 303, whether the road object 307 is located on the at least one second link 309, whether the at least one second link 309 is associated with or connected to left side of the first link 303, and whether the at least one second link 309 is associated with or connected to right side of the first link 303. To that end, the system 101 may be configured to determine a third heading data and a fourth heading data for determining the second heading data 321.

In various embodiments, the system 101 may be configured to determine the third heading data for the road object observation 313, based on the derived heading data 319. In various embodiments, the system 101 may subtract ninety degree or its equivalent from the derived heading data 319 to determine the third heading data. Further, the system 101 may determine whether the third heading data is less than zero degree (i.e. an angle in negative degree) or its equivalent. In response to determining the third heading data is less than zero degree or its equivalent, the system 101 may be configured to add three hundred and sixty degree or its equivalent to the third heading data to determine the third heading data. For instance, the system 101 may determine the third heading data using two equations: H1=(the derived heading data 319)−90° (Equation 1); and if H1<0° {H1=360°+H1} (Equation 2), where, H1 is the third heading data.

In various embodiments, the system 101 may be configured to determine the fourth heading data for the road object observation 313, based on the derived heading data 319. In various embodiments, the system 101 may add ninety degree or its equivalent to the derived heading data 319 to determine the fourth heading data. Further, the system 101 may determine whether the fourth heading data is more than three hundred and sixty degree or its equivalent. In response to determining the fourth heading data is more than three hundred and sixty degree or its equivalent, the system 101 may be configured to subtract three hundred and sixty degree or its equivalent from the fourth heading data to determine the fourth heading data. For instance, the system 101 may determine the fourth heading data using two equations: H2=(the derived heading data 319)+90° (Equation 3); and if H2>360° {H2=H2−360°} (Equation 4), where, H2 is the fourth heading data. In various embodiments, the system 101 may determine the third heading data and the fourth heading data as the second heading data 321 to include the fore-mentioned four factors that affect the first determination of the direction perpendicular to the derived heading data 319. To that end, the second heading data 321 may comprise the third heading data and/or the fourth heading data.

Further, the system 101 may be configured to identify the road object 307, based on the determined first heading data and the determined second heading data 321 such that the identified road object 307 is either determined as associated with the first link 303 or is determined to be not associated with the first link 303. For instance, the road object identification module 201*e* may be configured to identify the road object 307 as the road object 307, based on the determined first heading data and the determined second heading data 321 such that the identified road object 307 is either determined as associated with the first link 303 or is determined to be not associated with the first link 303. In other words, the system 101 may identify whether the road object 307 is associated with the first link 303 or not associated with the first link 303, based on the determined first heading data and the determined second heading data 321. Further, when the road object 307 is determined as not associated with the first link 303, no further processing is done for identifying the road object 307 and the road object 307 is dropped from a list of road objects associated with the first link 303. The road object 307 may be processed by some other algorithm, such as a ramp algorithm for correct identification in this manner.

In various embodiments, the system 101 may be configured to determine a first heading difference data for the road object observation 313, based on the first heading data and the third heading data. In various embodiments, the system 101 may subtract the third heading data from the first heading data to determine the first heading difference data. For instance, the system 101 may determine the first heading difference data using an equation: H3=diff (the first heading data, H1) (Equation 5), where, H3 is the first heading difference data and H1 is the third heading data.

In various embodiments, the system 101 may be configured to determine a second heading difference data for the road object observation 313, based on the first heading data and the fourth heading data. In various embodiments, the system 101 may subtract the fourth heading data from the first heading data to determine the second heading difference data. For instance, the system 101 may determine the second heading difference data using an equation: H4=diff (the first heading data, H2) (Equation 6), where, H4 is the second heading difference data and H2 is the fourth heading data.

In various embodiments, the system 101 may be configured to determine a minimum heading difference data among the first heading difference data and the second heading difference data. For instance, the system 101 may determine the minimum heading difference data using an equation: H5=min(H3, H4) or H5=min(diff (the first heading data, H1), diff (the first heading data, H2)) (Equation 6), where, H1 is the third heading data; H2 is the fourth heading data; H3 is the first heading difference data; H4 is the second heading difference data; and H5 is the minimum heading difference data.

In various embodiments, the system 101 may be configured to determine whether the minimum heading difference data is greater than a threshold heading difference data. In various embodiments, the threshold heading difference data may be a predetermined heading difference data. For instance, the threshold heading difference data may be forty five degree or its equivalent. In some example embodiments, the threshold heading difference data may be determined by experimentation and the like.

In response to determining the minimum heading difference data is greater than the threshold heading difference data, the system 101 may be configured to identify the road object 307 as the road object 307 associated with the first link 303. In response to determining the minimum heading difference data is less than the threshold heading difference data, the system 101 may be configured to identify the road object 307 as the road object 307 not associated with the first link 303.

Further, in some embodiments, the system 101 may be configured to identify the road object 307 as the road object 307 associated with the first link 303 or not associated with the first link 303, based on a first distance, a second distance, the first heading data and the second heading data. To that end, the system may determine whether the road object 307 is located on the at least one second link 309 (i.e. the candidate link) or on a downstream first link. As used herein, the downstream first link may refer to a road segment between two nodes (or two intersections) and located consecutively to the first link 303. In other words, the first link 303 and the downstream first link may be a sequence of links to form the freeway, the highway, the expressway, and the like. Further, the system 101 may determine a first distance between a start location of the at least one second link 309 (i.e. the candidate link) and the location associated with the road object observation 313 (i.e. the location of the road object observation 313); and determine whether the first distance is more than a threshold first distance. As used herein, the start location of the at least one second link 309 may refer to a location (or a location of a node) from where the at least one second link 309 starts. In various embodiments, the threshold first distance may be a predetermined first distance. For instance, the threshold first distance between the start location of the at least one second link 309 and the location associated with the road object observation 313 may be twenty meter or its equivalent. In some example embodiments, the threshold first distance may be determined by experimentation and the like. Furthermore, the system 101 may determine a second distance between the candidate matched location 317b (i.e. the matched location 317b) on the candidate link (i.e. the second link 309) and the location associated with the road object observation 313; and determine whether the second distance is more than a threshold second distance. In various embodiments, the threshold second distance may be a predetermined second distance. For instance, the threshold second distance between the matched location 317b and the location associated with the road object observation 313 may be thirty meter or its equivalent. In some example embodiments, the threshold second distance may be determined by experimentation and the like.

In some embodiments, the system 101 may identify the road object 307 as the road object 307 associated with the first link 303, if the road object 307 is located on the at least one second link 309 or on the downstream first link; the first distance is more than the threshold first distance; the minimum heading difference data is more than the threshold heading difference data; and the second distance is more than the threshold second distance. Further, the system 101 may configured to update the map database 105a, based on the identified road object 307. For instance, the system 101 may update the map database 105a as the road object 307 is determined as associated with the first link 303, if the road object 307 is identified as the road object 307 associated with the first link 303.

In some example embodiments, the system 101 may be further configured to accurately provide navigation functions to vehicle 301 travelling on the first link 303, in response to identifying the road object 307 as the road object 307 associated with the first link 303. Some non-limiting examples of the navigation functions may include providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

Here for the purpose of explanation, the vehicle 301 travelling on the first link 303 is considered, however, when the vehicle 301 is travelling on the at least one second link 309 (i.e. the ramp link, the parallel link, and the like), the system 101 may configured to receive a road object observation associated with a road object for the at least one second link 309; determine a first heading data for the at least one second link 309; determine a matched location for the road object observation on the first link 303; determine a second heading data for the road object observation; identify the road object as the road object is associated with the first link or not associated with the first link. Further, here for the purpose of the explanation, the first link 303 associated with only one second link 309 is considered, however, the system 101 may be configured to identify the road object, even if the first link 303 is associated with more than one second link 309.

FIG. 4A illustrates a schematic diagram 400a of an exemplary working environment of the system 101 for identifying a road object, when the first link is associated with more than one second link, in accordance with one or more example embodiments. As illustrated in FIG. 4A, the schematic diagram 400a may include the system 101, the network 103, and the mapping platform 105, a vehicle 401, a main link 403, a travel direction 405 associated with the main link 403, a road object 407, a first ramp link 409 associated with the main link 403, a travel direction 411 associated with the first ramp link 409, a second ramp link 413 associated with the main link 403, a travel direction 415 associated with the second ramp link 413, a parallel link 417 associated with the main link 403, and a travel direction 421 associated with the parallel link 417. As used herein, the main link 403 may refer to the first link 303 described in the detailed description of FIG. 3A. As used herein, the first ramp link 409, the second ramp link 413, and the parallel link 417 may refer to the at least one second link 309 described in the detailed description of FIG. 3A. As used herein, the travel direction 405, the travel direction 411, the travel direction 415, and the travel direction 421 may refer to a direction of travel of vehicles such as vehicle 401 on the main link 403, the first ramp link 409, the second ramp link 413, and the parallel link 417 respectively. As used herein, the vehicle 401 may be the vehicle 301 described in the detailed description of FIG. 3A. As used herein, the road object 407 may be the road object 307 described in the detailed description of FIG. 3A. Further, the system 101 may be configured to identify whether the road object 407 is associated with the main link 403 or not associated with the main link 403 as described in the detailed description of FIG. 4B.

FIG. 4B illustrates a schematic diagram 400*b* for identify whether the road object 407 is associated with the main link 403 or not associated with the main link 403, in accordance with one or more example embodiments. In various embodiments, the system 101 may be configured to obtain a road object observation 423 for the road object 407. As used herein, the road object observation 423 may be the road object observation 313 described in the detailed description of FIG. 3B. In various embodiments, the system 101 may be configured to determine the first heading data for the road object observation 423. For instance, the system 101 may be configured to determine the first heading data for the road object observation 423 as described in the detailed description of FIG. 3B.

In various embodiments, the system 101 may be configured to determine a set of candidate links, such as links 409, 413 and 417. In some embodiments, the system 101 may determine that a number of links (here three) in the set of candidate links is more than a threshold number of links. In various embodiments, the system 101 may be configured to determine the set of candidate links associated with the main link 403, when the number of candidate links 409, 413, and 417 is more than the threshold number of links. For instance, the system 101 may determine the first ramp link 409, the second ramp link 413, and the parallel link 417 associated with the main link 403 as the set of candidate links associated with the main link 403. In various embodiments, the system 101 may be configured to determine a candidate matched location 425, a candidate matched location 431, and a candidate matched location 437 for the road object observation 423 on the first ramp link 409, the second ramp link 413, and the parallel link 417 respectively as described in the detailed description of FIG. 3B and FIG. 3C. Here for purpose of explanation, the first ramp link 409 and the second ramp link 413 are considered as straight road segments, however, if the first ramp link 409 and the second ramp link 413 have the curved road geometry, the system 101 may divide the first ramp link 409 and the second ramp link 413 into a plurality of first shape segments, and a plurality of second shape segments respectively as described in the detailed description of FIG. 3B. Further, the system 101 may determine the candidate matched location 425 and the candidate matched location 431, based on the plurality of first shape segments and the plurality of second shape segments respectively as described in the detailed description of FIG. 3C.

In various embodiments, the system 101 may be configured to determine a set of candidate distances. In various embodiments, the set of candidate distances may comprise a first candidate distance between the candidate matched location 425 and the location associated with the road object observation 423; a second candidate distance between the candidate matched location 431 and the location associated with the road object observation 423; and a third candidate distance between the candidate matched location 437 and the location associated with the road object observation 423. In various embodiments, the first candidate distance may be associated with the first ramp link 409, the second candidate link may be associated with the second ramp link 413 and the third candidate link may be associated with the parallel link 417. In various embodiments, the system 101 may be configured to determine a shortest distance from the set of candidate distances. In various embodiments, the shortest distance determined from the set of candidate distances may correspond to a value of at least one the first candidate distance, a second candidate distance, and a third candidate distance which is smallest among the first candidate distance, a second candidate distance, and a third candidate distance in the set of candidate distances. For instance, if a value of the first candidate distance is smallest among a value of the second candidate distance and a value of the third candidate distance, the system 101 may determine the first candidate distance as the shortest distance. As used herein, a value of the candidate distance may indicate a scalar value of distance from one location to another location measured in meter or its equivalent.

In various embodiments, the system 101 may be configured to determine the candidate link form the set of candidate links (i.e. the first ramp link 409, the second ramp link 413, and the parallel link 417) which is associated with the determined shortest distance as the at least one second link to be used for heading calculations in further processing. In other words, the system 101 may determine at least one of the first ramp link 409, the second ramp link 413, or the parallel link 417 associated with the shortest distance as the candidate link. For instance, if the first candidate distance is the shortest distance, the system 101 may determine the first ramp link 409 associated with the first candidate distance as the at least one second link.

In various embodiments, the system 101 may be configured to determine a derived heading data 427 for the road object observation 423 based on the candidate matched location 425 on the first ramp link 409, in response to determining the first ramp link 409 as the candidate link. For instance, the system 101 may determine the derived heading data 427 as explained in the detailed description of FIG. 3D. Similarly, the system 101 may determine a derived heading data 433 for the road object observation 423 based on the candidate matched location 431 on the second ramp link 413, in response to determining the second ramp link 413 as the candidate link. Further, the system 101 may determine a derived heading data 439 for the road object observation 423 based on the candidate matched location 437 on the parallel link 417, in response to determining the parallel link 417 as the candidate link.

In various embodiments, the system 101 may be configured to determine a second heading data 429 for the road object observation 423 based on the derived heading data 427. For instance, the system 101 may be configured to determine the second heading data 429 for the road object observation 423 as described in the detailed description of FIG. 3D. Similarly, the system 101 may determine a second heading data 435 and a second heading data 441 for the road object observation 423, based on the derived heading data 433 and the derived heading data 439, respectively.

For purpose of explanation, if the first candidate distance between the location associated with the road object observation 423 and the candidate matched location 425 on the first ramp link 409 is considered as the shortest distance, in comparison to the second candidate distance and the third candidate distance, then the system 101 may determine the first ramp link as the candidate link associated with the shortest distance, and thus, the at least one second link. Accordingly, the system 101 may determine only the derived heading data 427 and the second heading data 429 for the road object observation 423 as explained in the detailed description of FIG. 3D. Further, in various embodiments, the system 101 may be configured to identify whether the road object 407 is associated with the main link 403 or not associated with the main link 403, based on the first heading data, the second heading data 429, in response to determining the first ramp link as the candidate link. In some example embodiments, the system 101 may determine a heading difference data between the first heading and the second heading data 429 as described in the detailed description of FIG. 3D. In some example embodiments, the system 101 may identify whether the road object 407 is associated with the main link 403 or not associated with the main link 403 by comparing the threshold heading difference data with the heading difference data between the first heading and the second heading data 429 as described in the detailed description of FIG. 3D. Further, in some embodiments, the system 101 may determine the first distance and the second distance for the first ramp link 409 with respect to the road object observation 423 for identifying whether the road object 407 is associated with the main link 403 or not associated with the main link 403 as described in the detailed description of FIG. 3D, in response to determining the first ramp link 409 as the candidate link associated with the shortest distance.

Further, the system 101 may be configured to accurately provide navigation functions to the vehicle 401 travelling on the main link 403, in response to identifying the road object 407 is associated with the first link 403. Some non-limiting examples of the navigation functions may include providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

FIG. 5A illustrates a flowchart depicting a method 500a for identifying the road object, in accordance with one or more example embodiments. It will be understood that each block of the flow diagram of the method 500a may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 203 of the system 101, employing an embodiment of the present invention and executed by the processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

Starting at block 501, the method 500a may comprise receiving the road object observation 313 associated with the road object 307 for the first link 303, wherein the first link 303 is associated with at least one second link 309. For instance, the road object observation reception module 201a may receive the road object observation 313 associated with the road object 307 for the first link 303. In various embodiments, the road object observation 313 may comprise the location of the vehicle 301 at where the road object observation 313 was made, the road object information of the road object 307 (for instance, speed limit value of the speed limit sign). Additionally, the road object observation 313 may comprise the timestamp data indicating a time instance (also includes date, month, and year) at which the road object observation was made.

At block 503, the method 500a may comprise determining the first heading data for the road object observation 313. For instance, the first heading data determination module 201b may determine the first heading data for the road object observation 313 as described in the detailed description of FIG. 3B. In various embodiments, the first heading data may comprise the heading data associated the road object 307.

At block 505, the method 500a may comprise determining the matched location 317b for the road object observation 313 on the at least one second link 309. For instance, the matched location determination module 201c may determine the matched location 317b for the road object observation 313 on the at least one second link 309 as described in the detailed description of FIG. 3B and FIG. 3C. Further, at bock 505, the method 500a may comprise some additional blocks, as illustrated in FIG. 5B, for determining the matched location 317b for the road object observation 313 on the at least one second link 309.

FIG. 5B illustrates a flowchart depicting a method 500b for determining the matched location 317b for the road object observation 313 on the at least one second link 309, in accordance with one or more example embodiments. The method 500b may be used in conjunction to the system 101 described in the detailed description of the FIG. 3A-3D.

Starting at block 505a, the method 500b may comprise determining the plurality of shape locations 315a, 315b, 315c, and 315d associated with the at least one second link 309. For instance, the matched location determination module 201c may determine the plurality of shape locations 315a, 315b, 315c, and 315d associated with the at least one second link 309 as described in the detailed description of FIG. 3B.

At block 505b, the method 500b may comprise dividing the at least one second link 309 into the plurality of shape segments 309a, 309b, and 309c, based on the plurality of shape locations 315a, 315b, 315c, and 315d. For instance, the matched location determination module 201c may divide the at least one second link 309 into the plurality of shape segments 309a, 309b, and 309c, based on the plurality of shape locations 315a, 315b, 315c, and 315d as described in the detailed description of FIG. 3B.

At block 505c, the method 500b may comprise determining the first closest location (317a, 317b, and 317c) for the road object observation 313 on each of the plurality of shape segments 309a, 309b, and 309c such that the distance between the received road object observation 313 and the first closest location (317a, 317b, and 317c) on each of the plurality of shape segments 309a, 309b and 309c is the shortest distance in comparison to any other location on each of the corresponding plurality of shape segments 309a, 309b and 309c. For instance, the matched location determination module 201c may determine the first closest location (317a, 317b, and 317c) for the received road object observation 313 on each of the plurality of shape segments 309a, 309b, and 309c as described in the detailed description of FIG. 3C.

At block 505d, the method 505b may comprise determining the second closest location 317b among the determined first closest location (317a, 317b, and 317c) on each of the plurality of shape segments 309a, 309b and 309c as the matched location 317b, wherein for the second closest location 317b the shortest distance is smallest among the determined shortest distances for each of the plurality of shape segments 309a, 309b and 309c. For instance, the matched location determination module 201c may determine the second closest location 317b among the determined first closest location (317a, 317b, and 317c) on each of the plurality of shape segments 309a, 309b and 309c as described in the detailed description of FIG. 3C. In various embodiments, the second closest location 317b may be the matched location 317b for the road object observation 313 on the at least one second link 309.

As should be understood, once the second closest location 317b (i.e. the matched location 317b) is determined at block 505d, the method 500d may continue with block 507 of the method 500a. At block 507, the method 500a may comprise determining the second heading data 321 for the received road object observation 313, based on the determined matched location 317b. For instance, the second heading data determination module 201d may determine the second heading data 321 for the received road object observation 313, based on the determined matched location 317b as described in the detailed description of FIG. 3D. Further, at bock 507, the method 500a may comprise some additional blocks, as illustrated in conjunction with FIG. 5C, for determining the second heading data 321 for the received road object observation 313, based on the determined matched location 317b.

FIG. 5C illustrates a flowchart depicting a method 500c for determining the second heading data 321 for the received road object observation 313, based on the determined matched location 317b, in accordance with one or more example embodiments. The method 500c may be used in conjunction to the system 101 described in the detailed description of FIGS. 3A-3D and FIGS. 4A-4B.

Starting at block 507a, the method 500c may comprise determining whether a number of links in a set of candidate links associated with the first link 303 is more than the threshold number of links. In response to determining the number of links is not more than the threshold number of links, the method 507b may continue with block 507b.

At block 507b, the method 500c may comprise determining the derived heading data 319 for the road object observation 313, based on the determined matched location 317b on the at least one second link (i.e. the second link 309). For instance, the second heading data determination module 201d may determine the derived heading data 319 for the road object observation 313, based on the determined matched location 317b as described in the detailed description of FIG. 3D.

At block 507c, the method 500c may comprise determining the third heading data for the road object observation 313, based on the derived heading data 319. For instance, the second heading data determination module 201d may determine the third heading data for the road object observation 313, based on the derived heading data 319 as described in the detailed description of FIG. 3D.

At block 507d, the method 500c may comprise determining the fourth heading data for the road object observation 313, based on the derived heading data 319. For instance, the second heading data determination module 201d may determine the fourth heading data for the road object observation 313, based on the derived heading data 319 as described in the detailed description of FIG. 3D. In various embodiments, the second heading data may comprise at least one of the third heading data, the fourth heading data, or a combination thereof.

In response to determining the number of links in the set of candidate links associated with the first link 303 is more than the threshold number of links (at block 507a), the method 500c may continue with block 507e.

At block 507e, the method 500c may comprise determining the set of candidate links associated with the first link 403. For instance, the system may determine the first ramp link 409, the second ramp link 413, and the parallel link 417 as the set of candidate links associated with the first link 403 as explained in the detailed description of FIG. 4B.

At block 507f, the method 500c may comprise determining the candidate matched location on each link in the set of candidate links. For instance, the system 101 may determine the candidate matched location 425, the candidate matched location 431 and the candidate matched location 437 for the road object observation 423 on the first ramp link 409, on the second ramp link 413, and on the parallel link 417 respectively as explained in the detailed description of FIG. 4B.

At block 507g, the method 500c may comprise determining the set of candidate distances. For instance, the system 101 may determine the first candidate distance, the second candidate distance, and the third candidate distance as the set of candidate distances as explained in the detailed description of FIG. 4B.

At block 507h, the method 500c may comprise determining a shortest distance from the set of candidate distances, wherein the shortest distance corresponds to a value of the candidate distance which is smallest among all the candidate distances in the set of candidate distances. For instance, the system 101 may determine the first candidate distance as the shortest distance, if the value of the first candidate distance is smallest among the value of the second candidate distance and the value of the third candidate distance, as explained in the detailed description of FIG. 4B.

At block 507*i*, the method 500*c* may comprise determining the candidate link from the set of candidate links which is associated with the determined shortest distance. For instance, the system 101 may determine the first ramp link 409 associated with the first candidate distance as the shortest distance, if the first candidate distance is determined as the shortest distance, as explained in the detailed description of FIG. 4B. Further, the candidate link determined to be associated with the shortest distance is identified as the at least one second link to be used for all further processing and heading calculations.

At block 507*j*, the method 500*c* may comprise determining the second heading data 429 based on the determined candidate link (for instance, the first ramp link 409). For instance, the system 101 may determine the second heading data 429, in response to determining the first ramp link 409 as the candidate link, which will be the at least one second link, as explained in the detailed description of FIG. 4B. In some example embodiments, the system 101 may continue with block 507*b* for executing the block 507*j*. For instance, the system 101 may determine, at block 507*b*, the derived heading data 427; determine, at block 507*c*, the third heading data for the road object observation 423, based on the derived heading data 427; and determine, at block 507*d*, the fourth heading data for the road object observation 423, based on the derived heading data 427. In some example embodiments, the second heading data 429 may comprise the third heading data determined based on the derived heading data 427 and the fourth heading data determined based on the derived heading data 427.

As should be understood, once the fourth heading data is determined at block 507*d*, the method 500*c* may continue with block 509 of the method 500*a*. At block 509, the method 500*a* may comprise identifying the road object 307 based on the determined first heading data and the determined second heading data 321 (or the second heading data 429) such that the identified road object 307 (or the road object 407) is determined as associated with the first link 303 (or the main link 403) or is determined as not associated with the first link 303 (or the main link 403). For instance, the road object identification module 201*e* may identify the road object 307 as the road object 307 associated with the first link 303 or not associated with the first link 303, based on the determined first heading data and the determined second heading data 321 as described in the detailed description of FIG. 3D. Further, at bock 509, the method 500*a* may comprise some additional blocks, as illustrated in conjunction with FIG. 5D, for identifying the road object 307 as the road object 307 associated with the first link 303 or not associated with the first link 303.

FIG. 5D illustrates a flowchart depicting a method 500*d* for identifying the road object 307 as the road object 307 associated with the first link 303 or not associated with the first link 303, in accordance with one or more example embodiments. The method 500*d* may be used in conjunction to the system 101 described in the detailed description of FIG. 3A-3D.

Starting at block 509*a*, the method 500*d* may comprise determining the first heading difference data for the road object observation 313, based on the first heading data and the third heading data. For instance, the road object identification module 201*e* may determine the first heading difference data for the road object observation 313, based on the first heading data and the third heading data as described in the detailed description of the FIG. 3D.

At block 509*b*, the method 500*d* may comprise determining the second heading difference data for the road object observation 313, based on the first heading data and the fourth heading data. For instance, the road object identification module 201*e* may determine the second heading difference data for the road object observation 313, based on the first heading data and the fourth heading data as described in the detailed description of the FIG. 3D.

At block 509*c*, the method 500*d* may comprise determining the minimum heading difference data among the first heading difference data and the second heading difference data. For instance, the road object identification module 201*e* may determine the minimum heading difference data among the first heading difference data and the second heading difference data as described in the detailed description of the FIG. 3D.

At block 509*d*, the method 500*d* may comprise determining whether the minimum heading difference data is greater than the threshold heading difference data. For instance, the road object identification module 201*e* may determine whether the minimum heading difference data is greater than the threshold heading difference data. In response to determining the minimum heading difference data is greater than the threshold heading difference data, the method 500*d* may continue with block 509*e*.

At block 509*e*, the method 500*d* may comprise identifying the road object 307 as the road object 307 associated with the first link 303. For instance, the road object identification module 201*e* may identify the road object 307 as the road object 307 associated with the first link 303. In response to determining the minimum heading difference data is not greater than the threshold heading difference data, the method 500*d* may continue with block 509*f*.

At block 509*f*, the method 500*d* may comprise identifying the road object 307 as the road object 307 not associated with the first link 303. For instance, the road object identification module 201*e* may identify the road object 307 as the road object 307 not associated with the first link 303.

As should be understood, once the road object 307 is identified as associated with the first link 303 at block 509*e*, the method 500*d* may continue with the method 500*a*. In some example embodiments, the method 500*a* may comprise some additional blocks for identifying the road object 307 as the road object 307 associated with the first link 303 or not associated with the first link 303, based on the first distance, the second distance, the first heading data and the second heading data.

FIG. 5E illustrates a flowchart depicting a method 500*e* for identifying the road object 307 as the road object 307 associated with the fist link 303 or not associated with the first link 303, based on the first distance, the second distance, the first heading data and the second heading data, in accordance with one or more example embodiments. The method 500*e* may be used in conjunction to the system 101 described in the detailed description of FIG. 3A-3D.

Starting at block 511, the method 500*e* may comprise determining the first distance between the start location of the candidate link (i.e. the second link 309) and the location associated with the received road object observation 313. For instance, the road object identification module 201*e* may determine the first distance between the start location of the second link 309 and the location associated with the received road object observation 313. Further, in some embodiments, the method 500e may comprise, at block 511, determining whether the first distance is more than the threshold first distance. For instance, the road object identification module 201e may determine whether the first distance is more than the threshold first distance.

At block 513, the method 500e may comprise determining the second distance between the determined candidate matched location 317b (i.e. the matched location 317b) on the candidate link (i.e. the second link 309) and the location associated with the received road object observation 313. For instance, the road object identification module 201e may determine the second distance between the determined candidate matched location 317b on the candidate link (i.e. the second link 309) and the location associated with the received road object observation 313. Further, in some embodiments, the method 500e may comprise, at block 513, determining whether the second distance is more than the threshold second distance. For instance, the road object identification module 201e may determine whether the second distance is more than the threshold second distance.

At block 515, the method 500e may comprise identifying the road object 307 as the road object 307 associated with the first link 303 or the road object not associated with the first link 303, based on the first distance, the second distance, the first heading data and the second heading data 321. For instance, the road object identification module 201e may identify the road object 307 as the road object 307 associated with the first link 303 or not associated with the first link 303, based on the first distance, the second distance, the first heading data and the second heading data 321. In various embodiments, the road object identification module 201e may identify the road object 307 as the road object 307 associated with the first link 303, if the road object 307 is located on the at least one second link 309 or on the downstream first link; the first distance is more than the threshold first distance; the minimum heading difference data is more than the threshold heading difference data; and the second distance is more than the threshold second distance.

On implementing the method 500a, the method 500b, the method 500c, the method 500d and the method 500e disclosed herein, the system 101 may accurately provide navigation functions to vehicle 301 travelling on the first link 303, in response to identifying the road object 307 as the road object 307 associated with the first link 303. Some non-limiting examples of the navigation functions may include providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for identifying a road object, the system comprising:
   a memory configured to store computer-executable instructions; and
   one or more processors configured to execute the instructions to:
   receive, over a communication network, a road object observation associated with the road object for a first link, wherein the first link is associated with at least one second link;
   determine a first heading data for the received road object observation;
   determine a matched location for the received road object observation on the at least one second link, wherein to determine the matched location for the received road object observation comprises:
   determine a plurality of shape locations associated with the at least one second link;
   divide the at least one second link into a plurality of shape segments, based on the plurality of shape locations;
   determine a first closest location for the received road object observation on each of the plurality of shape segments; and
   determine a second closest location among the determined first closest location on each of the plurality of shape segments as the matched location;
   determine a second heading data for the received road object observation, based on the determined matched location;
   identify the road object based on the determined first heading data and the determined second heading data, wherein as a result of identifying, the identified road object is either determined as associated with the first link or is determined to be not associated with the first link;
   update a map database, based on the identified road object; and
   enable navigational routing functions, based on the updated map database.

2. The system of claim 1,
   wherein a distance between the received road object observation and the first closest location on each of the plurality of shape segments is a shortest distance in comparison to any other location on each of the corresponding plurality of shape segments; and
   wherein for the second closest location the shortest distance is smallest among the determined shortest distances for each of the plurality of shape segments.

3. The system of claim 2, wherein the first closest location on a shape segment of the plurality of shape segments is a scalar projection of the received road object observation on the shape segment of the plurality of shape segments.

4. The system of claim 2, wherein to determine the second heading data for the road object observation, the one or more processors are further configured to:

determine a set of candidate links associated with the first link;
determine a candidate matched location on each link in the set of candidate links;
determine a set of candidate distances comprising a candidate distance between each candidate matched location and a location of the road object observation;
determine a shortest distance from the set of candidate distances, wherein the shortest distance corresponds to a value of the candidate distance which is smallest among all the candidate distances in the set of candidate distances;
determine the at least one second link as the candidate link from the set of candidate links which is associated with the determined shortest distance; and
determine the second heading data based on the determined at least one second link.

5. The system of claim 4, wherein the one or more processors are further configured to:
determine a first distance between a start location of the at least one second link and the location associated with the received road object observation;
determine a second distance between the determined matched location on the at least one second link and the location associated with the received road object observation; and
identify the road object based on the first distance, the second distance, the first heading data and the second heading data, wherein as a result of identifying, the identified road object is either determined as associated with the first link or is determined to be not associated with the first link.

6. The system of claim 1, wherein to determine the second heading data for the road object observation, the one or more processor is further configured to:
determine a derived heading data for the road object observation, based on the determined matched location;
determine a third heading data for the road object observation, based on the derived heading data; and
determine a fourth heading data for the road object observation, based on the derived heading data.

7. The system of claim 6, wherein to identify the road object, the one or more processor is further configured to:
determine a first heading difference data for the road object observation, based on the first heading data and the third heading data;
determine a second heading difference data for the road object observation, based on the first heading data and the fourth heading data;
determine a minimum heading difference data among the first heading difference data and the second heading difference data; and
identify the road object, in response to determining the minimum heading difference data is greater than a threshold heading difference data.

8. A method for identifying a road object, the method comprising:
receiving, over a communication network, a road object observation associated with the road object for a first link, wherein the first link is associated with at least one second link;
determining a first heading data for the received road object observation;
determining a matched location for the received road object observation on the at least one second link, wherein to determine the matched location for the received road object observation comprises:
determining a plurality of shape locations associated with the at least one second link;
dividing the at least one second link into a plurality of shape segments, based on the plurality of shape locations;
determining a first closest location for the received road object observation on each of the plurality of shape segments;
determining a second closest location among the determined first closest location on each of the plurality of shape segments as the matched location;
determining a second heading data for the received road object observation, based on the determined matched location;
identifying the road object based on the determined first heading data and the determined second heading data, wherein as a result of identifying, the identified road object is either determined as associated with the first link or is determined to be not associated with the first link;
updating a map database, based on the identified road object; and
enabling navigational routing functions, based on the updated map database.

9. The method of claim 8, wherein a distance between the received road object observation and the first closest location on each of the plurality of shape segments is a shortest distance in comparison to any other location on each of the corresponding plurality of shape segments; and
wherein for the second closest location the shortest distance is smallest among the determined shortest distances for each of the plurality of shape segments.

10. The method of claim 9, wherein the first closest location on a shape segment of the plurality of shape segments is a scalar projection of the received road object observation on the shape segment of the plurality of shape segments.

11. The method of claim 9, wherein determining the second heading data for the road object observation further comprises:
determining a set of candidate links associated with the first link;
determining a candidate matched location on each link in the set of candidate links;
determining a set of candidate distances comprising a candidate distance between each candidate matched location and a location of the road object observation;
determining a shortest distance from the set of candidate distances, wherein the shortest distance corresponds to a value of the candidate distance which is smallest among all the candidate distances in the set of candidate distances;
determining the at least one second link as the candidate link from the set of candidate links which is associated with the determined shortest distance; and
determining the second heading data based on the at least one second link.

12. The method of claim 11, further comprising:
determining a first distance between a start location of the at least one second link and the location associated with the received road object observation;
determining a second distance between the determined matched location on the at least one second link and the location associated with the received road object observation; and
identifying the road object based on the first distance, the second distance, the first heading data and the second heading data, wherein as a result of identifying, the identified road object is either determined as associated with the first link or is determined to be not associated with the first link.

13. The method of claim 8, wherein determining the second heading data for the received road object observation further comprises:
    determining a derived heading data for the road object observation, based on the determined matched location;
    determining a third heading data for the road object observation, based on the derived heading; and
    determining a fourth heading data for the road object observation, based on the derived heading data.

14. The method of claim 13, wherein identifying the road object further comprises:
    determining a first heading difference data for the road object observation, based on the first heading data and the third heading data;
    determining a second heading difference data for the road object observation, based on the first heading data and the fourth heading data;
    determining a minimum heading difference data among the first heading difference data and the second heading difference data; and
    identifying the road object, in response to determining the minimum heading difference data is greater than a threshold heading difference data.

15. The method of claim 8, further comprising updating a map database, based on the identified road object.

16. A computer program product comprising a non-transitory computer readable medium having stored thereon computer executable instruction which when executed by one or more processors, cause the one or more processors to carry out operations for identifying a road object, the operations comprising:
    receiving, over a communication network, a road object observation associated with the road object for a first link, wherein the first link is associated with at least one second link;
    determining a first heading data for the received road object observation;
    determining a matched location for the received road object observation on the at least one second link, wherein to determine the matched location for the received road object observation comprises:
    determining a plurality of shape locations associated with the at least one second link;
    dividing the at least one second link into a plurality of shape segments, based on the plurality of shape locations;
    determining a first closest location for the received road object observation on each of the plurality of shape segments;
    determining a second closest location among the determined first closest location on each of the plurality of shape segments as the matched location;
    determining a second heading data for the received road object observation, based on the determined matched location;
    identifying the road object based on the determined first heading data and the determined second heading data, wherein as a result of identifying, the identified road object is either determined as associated with the first link or is determined to be not associated with the first link;
    updating a map database, based on the identified road object; and
    enabling navigational routing functions, based on the updated map database.

17. The computer program product of claim 16, wherein a distance between the received road object observation and the first closest location on each of the plurality of shape segments is a shortest distance in comparison to any other location on each of the corresponding plurality of shape segments; and
    wherein for the second closest location the shortest distance is smallest among the determined shortest distances for each of the plurality of shape segments.

18. The computer program product of claim 16, wherein for determining the second heading data for the road object observation, the operations further comprise:
    determining a derived heading data for the road object observation, based on the determined matched location;
    determining a third heading data for the road object observation, based on the derived heading data; and
    determining a fourth heading data for the road object observation, based on the derived heading.

19. The computer program product of claim 18, wherein for identifying the road object, the operations further comprise:
    determining a first heading difference data for the road object observation, based on the first heading data and the third heading data;
    determining a second heading difference data for the road object observation, based on the first heading data and the fourth heading data;
    determining a minimum heading difference data among the first heading difference data and the second heading difference data;
    determining whether the minimum heading difference data is greater than a threshold heading difference data; and
    identifying the road object, in response to determining the minimum heading difference data is greater than the threshold heading difference data.

* * * * *